(12) United States Patent
Repetto et al.

(10) Patent No.: US 7,596,525 B1
(45) Date of Patent: *Sep. 29, 2009

(54) COMPUTER-IMPLEMENTED METHOD AND APPARATUS FOR SELECTING AN INVESTMENT PORTFOLIO AND ADMINISTERING AN INVESTMENT COMPANY BASED IN PART ON SOCIALLY RESPONSIBLE INVESTING CONSIDERATIONS

(75) Inventors: Eduardo Repetto, Bee Cave, TX (US); David G. Booth, Austin, TX (US)

(73) Assignee: Dimensional Fund Advisors LP, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,667

(22) Filed: Apr. 13, 2009

Related U.S. Application Data

(63) Continuation of application No. 12/261,535, filed on Oct. 30, 2008.

(51) Int. Cl.
*G06Q 40/00* (2006.01)
(52) U.S. Cl. .................................... 705/36 R
(58) Field of Classification Search ............. 705/36–40
See application file for complete search history.

(56) References Cited

U.S. PATENT DOCUMENTS

2005/0049948 A1* 3/2005 Fuscone ...................... 705/35

(Continued)

FOREIGN PATENT DOCUMENTS

WO 2006089565 A2 8/2006

WO WO 2006/089565 * 8/2006

OTHER PUBLICATIONS

Socially Responsible Investment: Your QUestions Answered- An Information Guide for Superannuation Trustees and Fund Managers, Monash Sustainability Enterprises and KPMG, Jul. 2001, 8 pages.*

(Continued)

*Primary Examiner*—Hani Kazimi
*Assistant Examiner*—Olabode Akintola
(74) *Attorney, Agent, or Firm*—Pantich Schwarze Belisario & Nadel LLP

(57) ABSTRACT

A computer-implemented method is provided for selecting a recommended investment portfolio based in part on socially responsible considerations. A portfolio of securities is identified for potential inclusion in the recommended investment portfolio. Socially responsible investing (SRI) scores are provided for the identified securities, and the identified securities are ranked relative to each other based on their SRI scores in a computerized ranking engine. A processor receives an entry of initial weightings for each of the identified securities, or data by which initial weightings for each of the identified securities can be objectively calculated; the ranking of the identified securities based on their SRI scores; and an SRI multiplier algorithm that is correlated with the relative ranking. The initial weightings or the data are unadjusted by socially responsible considerations. The processor uses a weighting calculation engine to calculate adjusted weightings for the portfolio of securities using at least the entered items. Securities having higher ranked SRI scores relative to other securities receive greater weightings, and the weightings include non-binary weightings. The processor outputs the adjusted weightings for the portfolio of securities. The adjusted weightings are used to select the recommended investment portfolio based in part on socially responsible considerations. The recommended investment portfolio may also be used to manage an investment company that selects securities based in part on environmental impact considerations.

20 Claims, 17 Drawing Sheets

U.S. PATENT DOCUMENTS

2006/0015433 A1  1/2006  Arnott et al.
2008/0086387 A1  4/2008  O'Rourke et al.
2008/0162372 A1  7/2008  Margolis et al.
2008/0243716 A1* 10/2008 Ouimet et al. ............ 705/36 R

OTHER PUBLICATIONS

Socially Responsible Investment: Your Questions Answered—An Information Guide for Superannuation Trustees and Fund Managers, Monash Sustainability Enterprises and KPMG, Jul. 2001, 8 pages.

* cited by examiner $$\text{Scaled "Core" Weight} = \frac{MCAP\ Wt \times "Core"\ Multiplier}{\sum(MCAP\ Wt \times "Core"\ Multiplier)}$$

$$\text{Scaled "Sustainable" Weight} = \frac{Scaled"Core"Wt \times "SRI"Multiplier}{\sum(Scaled"Core"Wt \times "SRI"Multiplier)}$$

Sum of MCAP Wt. X "Core" Multiplier     1.897
Sum of Scaled "Core" Wt. X "SRI" Multiplier     0.979

| Name | Industry Group | MCAP Wt. | "Core" Multiplier | Scaled "Core" Weight | SRI Score | SRI Multiplier | Scaled Sustainable Weight |
|---|---|---|---|---|---|---|---|
| EXXON MOBIL CORP | Ind Group 1 | 3.03% | 1.25 | 2.00% | 0.806 | 0.4268 | 0.87% |
| GENERAL ELECTRIC C | Ind Group 2 | 2.04% | 1.25 | 1.34% | 1.769 | 1.3469 | 1.85% |
| MICROSOFT CORP | Ind Group 3 | 1.82% | 1.25 | 1.20% | 1.894 | 1.2274 | 1.50% |
| WAL-MART STORES IN | Ind Group 4 | 1.70% | 1.25 | 1.12% | 1.409 | 0.7010 | 0.80% |
| PROCTER & GAMBLE C | Ind Group 4 | 1.53% | 1.25 | 1.01% | 1.566 | 1.2961 | 1.33% |
| JOHNSON & JOHNSON | Ind Group 5 | 1.44% | 1.25 | 0.95% | 2.08 | 1.7367 | 1.68% |
| AT&T INC | Ind Group 6 | 1.38% | 1.75 | 1.27% | 1.134 | 0.5787 | 0.75% |
| CHEVRON CORP | Ind Group 1 | 1.29% | 1.75 | 1.19% | 1.409 | 1.5144 | 1.84% |
| INTL BUSINESS MACH | Ind Group 3 | 1.20% | 1.25 | 0.79% | 2.159 | 1.6941 | 1.37% |
| APPLE INC | Ind Group 3 | 1.10% | 1.25 | 0.72% | 1.893 | 1.1250 | 0.83% |
| CISCO SYSTEMS INC | Ind Group 3 | 1.04% | 1.25 | 0.68% | 1.994 | 1.3671 | 0.95% |
| BANK OF AMERICA CO | Ind Group 8 | 1.04% | 1.75 | 0.96% | 1.815 | 1.3382 | 1.31% |
| JPMORGAN CHASE & C | Ind Group 8 | 0.96% | 1.75 | 0.89% | 1.607 | 1.1250 | 1.02% |
| PFIZER INC | Ind Group 5 | 0.94% | 1.75 | 0.87% | 1.779 | 1.2500 | 1.11% |
| INTEL CORP | Ind Group 3 | 0.94% | 1.25 | 0.62% | 1.739 | 1.1217 | 0.71% |
| CONOCOPHILLIPS | Ind Group 1 | 0.91% | 1.75 | 0.84% | 0.889 | 0.8000 | 0.69% |
| COCA-COLA CO/THE | Ind Group 4 | 0.88% | 1.25 | 0.58% | 1.632 | 1.4191 | 0.84% |
| HEWLETT-PACKARD CO | Ind Group 3 | 0.84% | 1.25 | 0.56% | 2.124 | 1.4150 | 0.80% |
| ORACLE CORP | Ind Group 3 | 0.82% | 1.25 | 0.54% | 1.43 | 0.0000 | 0.00% |
| SCHLUMBERGER LTD | Ind Group 1 | 0.82% | 1.25 | 0.54% | 1.309 | 1.2819 | 0.71% |
| GOOGLE INC-CL A | Ind Group 3 | 0.81% | 1.25 | 0.53% | 1.55 | 0.5000 | 0.27% |
| PHILIP MORRIS INTE | Ind Group 4 | 0.81% | 1.25 | 0.53% | N/A | 1.1250 | 0.61% |
| PEPSICO INC | Ind Group 4 | 0.78% | 1.25 | 0.52% | 1.562 | 1.1749 | 0.62% |
| CITIGROUP INC | Ind Group 8 | 0.75% | 1.75 | 0.70% | 2.046 | 1.8000 | 1.28% |
| WELLS FARGO & CO | Ind Group 8 | 0.73% | 1.75 | 0.67% | 1.981 | 1.7042 | 1.17% |
| VERIZON COMMUNICAT | Ind Group 6 | 0.73% | 1.75 | 0.67% | 1.338 | 1.3478 | 0.93% |
| ABBOTT LABORATORIE | Ind Group 5 | 0.65% | 1.25 | 0.43% | 1.839 | 1.2500 | 0.54% |
| QUALCOMM INC | Ind Group 3 | 0.63% | 1.25 | 0.42% | 1.552 | 0.6471 | 0.27% |
| MERCK & CO. INC. | Ind Group 5 | 0.56% | 1.25 | 0.37% | 1.779 | 1.1305 | 0.42% |
| MCDONALD'S CORP | Ind Group 9 | 0.51% | 1.25 | 0.34% | 1.482 | 0.8000 | 0.27% |
| AMGEN INC | Ind Group 5 | 0.49% | 1.25 | 0.32% | 1.418 | 0.1286 | 0.04% |
| OCCIDENTAL PETROLE | Ind Group 1 | 0.47% | 1.25 | 0.31% | 1.039 | 1.0682 | 0.34% |
| GOLDMAN SACHS GROL | Ind Group 8 | 0.47% | 1.75 | 0.43% | 1.54 | 0.8000 | 0.35% |
| UNITED TECHNOLOGIE | Ind Group 2 | 0.46% | 1.25 | 0.30% | 1.912 | 1.8000 | 0.56% |
| MONSANTO CO | Ind Group 10 | 0.46% | 1.25 | 0.30% | 0.859 | 0.5000 | 0.15% |
| MEDTRONIC INC | Ind Group 5 | 0.45% | 1.25 | 0.30% | 1.45 | 0.5000 | 0.15% |
| WALT DISNEY CO/THE | Ind Group 9 | 0.44% | 1.75 | 0.41% | 1.874 | 1.5288 | 0.64% |
| TIME WARNER INC | Ind Group 9 | 0.43% | 1.75 | 0.39% | 1.739 | 1.2500 | 0.50% |

Figure 3A

| Company | Group | | | | | | |
|---|---|---|---|---|---|---|---|
| AMERICAN INTERNATI | Ind Group 8 | 0.42% | 1.75 | 0.39% | 1.83 | 1.4150 | 0.56% |
| WYETH | Ind Group 5 | 0.42% | 1.25 | 0.28% | 1.858 | 1.4020 | 0.40% |
| US BANCORP | Ind Group 8 | 0.40% | 1.25 | 0.27% | 1.452 | 0.5000 | 0.14% |
| ELI LILLY & CO | Ind Group 5 | 0.39% | 1.25 | 0.25% | 1.453 | 0.5000 | 0.13% |
| CVS CAREMARK CORP | Ind Group 4 | 0.38% | 1.75 | 0.35% | 1.3 | 0.2737 | 0.10% |
| 3M CO | Ind Group 2 | 0.37% | 1.25 | 0.24% | 1.461 | 0.8000 | 0.20% |
| EXELON CORP | Ind Group 11 | 0.36% | 1.25 | 0.24% | 0.913 | 0.5260 | 0.13% |
| BOEING CO | Ind Group 2 | 0.35% | 1.25 | 0.23% | 1.399 | 0.8000 | 0.19% |
| GILEAD SCIENCES IN | Ind Group 5 | 0.35% | 1.25 | 0.23% | 1.552 | 1.1250 | 0.27% |
| MOSAIC CO/THE | Ind Group 10 | 0.35% | 1.25 | 0.23% | 0.652 | 0.0000 | 0.00% |
| KRAFT FOODS INC-CL | Ind Group 4 | 0.34% | 1.75 | 0.31% | 1.556 | 1.1250 | 0.36% |
| LOCKHEED MARTIN CO | Ind Group 2 | 0.34% | 1.25 | 0.22% | 1.778 | 1.4150 | 0.32% |
| HOME DEPOT INC | Ind Group 9 | 0.34% | 1.25 | 0.22% | 1.7 | 1.1250 | 0.25% |
| AMERICAN EXPRESS C | Ind Group 8 | 0.34% | 1.25 | 0.22% | 1.43 | 0.0000 | 0.00% |
| MORGAN STANLEY | Ind Group 8 | 0.33% | 1.75 | 0.30% | 1.784 | 1.2500 | 0.39% |
| DEVON ENERGY CORPC | Ind Group 1 | 0.33% | 1.75 | 0.30% | 1.388 | 1.4150 | 0.44% |
| DELL INC | Ind Group 3 | 0.32% | 1.25 | 0.21% | 2.377 | 1.8000 | 0.39% |
| UNITED PARCEL SERV | Ind Group 2 | 0.32% | 1.25 | 0.21% | 1.629 | 1.1250 | 0.24% |
| COMCAST CORP-CL A | Ind Group 9 | 0.32% | 1.75 | 0.29% | 1.763 | 1.4150 | 0.42% |
| MERRILL LYNCH & CO | Ind Group 8 | 0.32% | 1.75 | 0.29% | 1.87 | 1.4150 | 0.42% |
| ALTRIA GROUP INC | Ind Group 4 | 0.32% | 1.25 | 0.21% | 1.463 | 1.0875 | 0.23% |
| CATERPILLAR INC | Ind Group 2 | 0.31% | 1.25 | 0.21% | 1.92 | 1.8000 | 0.38% |
| UNION PACIFIC CORP | Ind Group 2 | 0.31% | 1.75 | 0.29% | 1.25 | 0.5000 | 0.15% |
| BAXTER INTERNATION | Ind Group 5 | 0.31% | 1.25 | 0.20% | 1.968 | 1.4150 | 0.30% |
| BRISTOL-MYERS SQUI | Ind Group 5 | 0.31% | 1.25 | 0.20% | 1.944 | 1.4150 | 0.29% |
| DU PONT (E.I.) DE | Ind Group 10 | 0.29% | 1.25 | 0.19% | 1.69 | 1.7713 | 0.35% |
| TARGET CORP | Ind Group 9 | 0.29% | 1.25 | 0.19% | 1.749 | 1.2500 | 0.25% |
| BANK OF NEW YORK M | Ind Group 8 | 0.29% | 1.75 | 0.27% | 1.569 | 0.9342 | 0.25% |
| HALLIBURTON CO | Ind Group 1 | 0.28% | 1.25 | 0.19% | 1.41 | 1.8000 | 0.34% |
| METLIFE INC | Ind Group 8 | 0.28% | 1.75 | 0.26% | 1.504 | 0.5000 | 0.13% |
| COLGATE-PALMOLIVE | Ind Group 4 | 0.28% | 1.25 | 0.18% | 1.788 | 1.8000 | 0.34% |
| APACHE CORP | Ind Group 1 | 0.28% | 1.75 | 0.26% | 1.228 | 1.2500 | 0.33% |
| HONEYWELL INTERNAT | Ind Group 2 | 0.27% | 1.25 | 0.18% | 1.48 | 0.8000 | 0.15% |
| UNITEDHEALTH GROUP | Ind Group 5 | 0.27% | 1.75 | 0.25% | 1.463 | 0.7165 | 0.18% |
| BURLINGTON NORTHER | Ind Group 2 | 0.27% | 1.75 | 0.25% | 0.803 | 0.0000 | 0.00% |
| GENERAL DYNAMICS C | Ind Group 2 | 0.27% | 1.25 | 0.18% | 1.548 | 1.1250 | 0.20% |
| EMERSON ELECTRIC C | Ind Group 2 | 0.26% | 1.25 | 0.17% | 1.678 | 1.1828 | 0.21% |
| LOWE'S COS INC | Ind Group 9 | 0.26% | 1.75 | 0.24% | 1.373 | 0.5000 | 0.12% |
| WALGREEN CO | Ind Group 4 | 0.26% | 1.25 | 0.17% | 1.398 | 0.5000 | 0.09% |
| AMAZON.COM INC | Ind Group 9 | 0.25% | 1.25 | 0.17% | 1.52 | 0.8000 | 0.14% |
| WACHOVIA CORP | Ind Group 8 | 0.25% | 1.25 | 0.16% | 1.448 | 0.3933 | 0.07% |
| FREEPORT-MCMORAN ( | Ind Group 10 | 0.25% | 1.75 | 0.23% | 0.99 | 0.6714 | 0.16% |
| HESS CORP | Ind Group 1 | 0.25% | 1.25 | 0.16% | 0.788 | 0.0000 | 0.00% |
| EBAY INC | Ind Group 3 | 0.24% | 1.25 | 0.16% | 1.568 | 0.8000 | 0.13% |
| CORNING INC | Ind Group 3 | 0.24% | 1.25 | 0.16% | 2.03 | 1.4150 | 0.23% |
| TEXAS INSTRUMENTS | Ind Group 3 | 0.23% | 1.25 | 0.15% | 1.783 | 1.1250 | 0.18% |
| MARATHON OIL CORP | Ind Group 1 | 0.23% | 1.75 | 0.21% | 1.48 | 1.8000 | 0.39% |
| EMC CORP/MASS | Ind Group 3 | 0.23% | 1.25 | 0.15% | 1.973 | 1.2500 | 0.19% |
| DOW CHEMICAL | Ind Group 10 | 0.23% | 1.75 | 0.21% | 1.525 | 1.4150 | 0.31% |
| SCHERING-PLOUGH CO | Ind Group 5 | 0.23% | 1.25 | 0.15% | 1.86 | 1.4150 | 0.22% |
| CELGENE CORP | Ind Group 5 | 0.23% | 1.25 | 0.15% | 1.434 | 0.5000 | 0.08% |
| PRUDENTIAL FINANCI | Ind Group 8 | 0.23% | 1.75 | 0.21% | 1.566 | 0.8000 | 0.17% |

Figure 3B

| | | | | | | |
|---|---|---|---|---|---|---|
| DIRECTV GROUP INC/ | Ind Group 9 | 0.23% | 1.25 | 0.15% | N/A | 1.1250 | 0.17% |
| NATIONAL OILWELL V | Ind Group 1 | 0.22% | 1.25 | 0.15% | 1.208 | 1.1250 | 0.17% |
| DEERE & CO | Ind Group 2 | 0.22% | 1.25 | 0.15% | 1.74 | 1.2500 | 0.19% |
| STATE STREET CORP | Ind Group 8 | 0.21% | 1.25 | 0.14% | 1.848 | 1.4150 | 0.20% |
| COSTCO WHOLESALE C | Ind Group 4 | 0.21% | 1.25 | 0.14% | 1.25 | 0.0000 | 0.00% |
| ANADARKO PETROLEUN | Ind Group 1 | 0.21% | 1.75 | 0.19% | 1.2 | 1.1250 | 0.22% |
| SOUTHERN CO | Ind Group 11 | 0.21% | 1.25 | 0.14% | 1.305 | 1.4150 | 0.20% |
| PRAXAIR INC | Ind Group 10 | 0.21% | 1.25 | 0.14% | 1.248 | 1.1250 | 0.16% |
| CHESAPEAKE ENERGY | Ind Group 1 | 0.20% | 1.75 | 0.19% | 1.208 | 1.1250 | 0.22% |
| STRYKER CORP | Ind Group 5 | 0.20% | 1.25 | 0.13% | 1.4 | 0.0000 | 0.00% |
| XTO ENERGY INC | Ind Group 1 | 0.20% | 1.25 | 0.13% | 1.168 | 1.1250 | 0.15% |
| SCHWAB (CHARLES) C | Ind Group 8 | 0.20% | 1.25 | 0.13% | 1.615 | 1.1323 | 0.15% |
| NORFOLK SOUTHERN C | Ind Group 2 | 0.20% | 1.75 | 0.19% | 1.025 | 0.0000 | 0.00% |
| AFLAC INC | Ind Group 8 | 0.20% | 1.25 | 0.13% | 1.516 | 0.8000 | 0.11% |
| WELLPOINT INC | Ind Group 5 | 0.20% | 1.75 | 0.18% | 1.54 | 1.1250 | 0.21% |
| YAHOO! INC | Ind Group 3 | 0.20% | 1.25 | 0.13% | 1.635 | 0.8000 | 0.11% |
| CSX CORP | Ind Group 2 | 0.19% | 1.75 | 0.18% | 1.225 | 0.0000 | 0.00% |
| WEATHERFORD INTL L | Ind Group 1 | 0.19% | 1.25 | 0.13% | 1.06 | 1.1250 | 0.14% |
| ALCOA INC | Ind Group 10 | 0.19% | 1.75 | 0.18% | 1.438 | 1.3887 | 0.25% |
| TRAVELERS COS INC/ | Ind Group 8 | 0.19% | 1.75 | 0.18% | 1.701 | 1.2500 | 0.22% |
| DANAHER CORP | Ind Group 2 | 0.19% | 1.25 | 0.13% | 1.38 | 0.5922 | 0.08% |
| EOG RESOURCES INC | Ind Group 1 | 0.19% | 1.25 | 0.12% | 1.32 | 1.4150 | 0.18% |
| FEDEX CORP | Ind Group 2 | 0.19% | 1.75 | 0.17% | 1.348 | 0.5000 | 0.09% |
| ILLINOIS TOOL WORK | Ind Group 2 | 0.19% | 1.25 | 0.12% | 1.668 | 1.1250 | 0.14% |
| NEWS CORP-CL A | Ind Group 9 | 0.19% | 1.75 | 0.17% | N/A | 1.1250 | 0.20% |
| BLACKROCK INC | Ind Group 8 | 0.19% | 1.25 | 0.12% | 1.597 | 1.1250 | 0.14% |
| KIMBERLY-CLARK COR | Ind Group 4 | 0.19% | 1.25 | 0.12% | 1.548 | 1.1250 | 0.14% |
| THERMO FISHER SCIE | Ind Group 5 | 0.19% | 1.25 | 0.12% | 1.504 | 0.8000 | 0.10% |
| DOMINION RESOURCES | Ind Group 11 | 0.18% | 1.25 | 0.12% | 0.831 | 0.4424 | 0.05% |
| RAYTHEON COMPANY | Ind Group 2 | 0.18% | 1.75 | 0.17% | 1.765 | 1.2500 | 0.21% |
| PNC FINANCIAL SERV | Ind Group 8 | 0.18% | 1.75 | 0.17% | 1.66 | 1.2500 | 0.21% |
| BAKER HUGHES INC | Ind Group 1 | 0.18% | 1.25 | 0.12% | 1.455 | 1.8000 | 0.22% |
| FPL GROUP INC | Ind Group 11 | 0.18% | 1.25 | 0.12% | 1.645 | 1.8000 | 0.22% |
| FRANKLIN RESOURCES | Ind Group 8 | 0.18% | 1.25 | 0.12% | 1.519 | 0.8000 | 0.10% |
| ALLSTATE CORP | Ind Group 8 | 0.18% | 1.75 | 0.16% | 1.646 | 1.2500 | 0.21% |
| APPLIED MATERIALS | Ind Group 3 | 0.18% | 1.25 | 0.12% | 2.225 | 1.8000 | 0.21% |
| SPRINT NEXTEL CORP | Ind Group 6 | 0.18% | 1.75 | 0.16% | 1.468 | 1.8000 | 0.30% |
| NIKE INC -CL B | Ind Group 9 | 0.17% | 1.25 | 0.11% | 2.46 | 1.8000 | 0.21% |
| MASTERCARD INC-CLA | Ind Group 3 | 0.17% | 1.25 | 0.11% | 1.53 | 0.5000 | 0.06% |
| MEDCO HEALTH SOLUT | Ind Group 5 | 0.17% | 1.25 | 0.11% | 1.418 | 0.5000 | 0.06% |
| NORTHROP GRUMMAN | Ind Group 2 | 0.17% | 1.75 | 0.16% | 1.628 | 1.1250 | 0.18% |
| CARNIVAL CORP | Ind Group 9 | 0.17% | 1.75 | 0.16% | 1.07 | 0.0000 | 0.00% |
| AUTOMATIC DATA PRO | Ind Group 3 | 0.17% | 1.25 | 0.11% | 1.55 | 0.5000 | 0.06% |
| ADOBE SYSTEMS INC | Ind Group 3 | 0.17% | 1.25 | 0.11% | 1.93 | 1.2500 | 0.14% |
| SOUTHERN COPPER CC | Ind Group 10 | 0.16% | 1.25 | 0.11% | 1.099 | 0.8000 | 0.09% |
| GENERAL MILLS INC | Ind Group 4 | 0.16% | 1.25 | 0.11% | 1.768 | 1.8000 | 0.20% |
| FIRST SOLAR INC | Ind Group 2 | 0.16% | 1.25 | 0.11% | N/A | 1.1250 | 0.12% |
| FIRSTENERGY CORP | Ind Group 11 | 0.16% | 1.25 | 0.11% | 1.159 | 1.1250 | 0.12% |
| DUKE ENERGY CORP | Ind Group 11 | 0.16% | 1.25 | 0.11% | 0.755 | 0.0000 | 0.00% |
| ACTIVISION BLIZZAR | Ind Group 3 | 0.16% | 1.25 | 0.10% | 1.534 | 0.5000 | 0.05% |
| MOTOROLA INC | Ind Group 3 | 0.16% | 1.75 | 0.14% | 2.448 | 1.8000 | 0.26% |
| BECTON DICKINSON & | Ind Group 5 | 0.16% | 1.25 | 0.10% | 1.763 | 1.1250 | 0.12% |

Figure 3C

| | | | | | | | |
|---|---|---|---|---|---|---|---|
| GENZYME CORP | Ind Group 5 | 0.15% | 1.25 | 0.10% | 1.512 | 1.1250 | 0.12% |
| PUBLIC SERVICE ENT | Ind Group 11 | 0.15% | 1.75 | 0.14% | 1.255 | 1.2500 | 0.18% |
| KELLOGG CO | Ind Group 4 | 0.15% | 1.25 | 0.10% | 1.818 | 1.8000 | 0.18% |
| AETNA INC | Ind Group 5 | 0.15% | 1.75 | 0.14% | 1.818 | 1.2500 | 0.17% |
| WESTERN UNION CO | Ind Group 3 | 0.15% | 1.25 | 0.10% | N/A | 1.1250 | 0.11% |
| NEWMONT MINING COR | Ind Group 10 | 0.14% | 1.25 | 0.10% | 1.254 | 1.1250 | 0.11% |
| ENTERGY CORP | Ind Group 11 | 0.14% | 1.25 | 0.10% | 1.025 | 0.8000 | 0.08% |
| CARDINAL HEALTH IN | Ind Group 5 | 0.14% | 1.25 | 0.09% | 1.403 | 0.0000 | 0.00% |
| AIR PRODUCTS & CHE | Ind Group 10 | 0.14% | 1.25 | 0.09% | 1.38 | 1.2500 | 0.12% |
| SYSCO CORP | Ind Group 4 | 0.14% | 1.25 | 0.09% | 1.513 | 1.1250 | 0.11% |
| HARTFORD FINANCIAL | Ind Group 8 | 0.14% | 1.75 | 0.13% | 1.885 | 1.4150 | 0.18% |
| LOEWS CORP | Ind Group 8 | 0.14% | 1.75 | 0.13% | 1.516 | 0.7505 | 0.10% |
| BOSTON SCIENTIFIC | Ind Group 5 | 0.14% | 1.25 | 0.09% | 1.94 | 1.4150 | 0.13% |
| SYMANTEC CORP | Ind Group 3 | 0.14% | 1.75 | 0.13% | 1.918 | 1.2500 | 0.16% |
| BEST BUY CO INC | Ind Group 9 | 0.13% | 1.25 | 0.09% | 1.618 | 1.1250 | 0.10% |
| JOHNSON CONTROLS I | Ind Group 9 | 0.13% | 1.75 | 0.12% | 1.908 | 1.8000 | 0.23% |
| CME GROUP INC | Ind Group 8 | 0.13% | 1.75 | 0.12% | N/A | 1.1250 | 0.14% |
| AVON PRODUCTS INC | Ind Group 4 | 0.13% | 1.25 | 0.09% | 1.493 | 1.1250 | 0.10% |
| VALERO ENERGY CORP | Ind Group 1 | 0.13% | 1.75 | 0.12% | 0.558 | 0.0000 | 0.00% |
| EXPRESS SCRIPTS IN | Ind Group 5 | 0.13% | 1.25 | 0.09% | 1.4 | 0.0000 | 0.00% |
| KROGER CO | Ind Group 4 | 0.13% | 1.25 | 0.09% | 1.505 | 1.1250 | 0.10% |
| COMCAST CORP-SPECI | Ind Group 9 | 0.13% | 1.75 | 0.12% | 1.763 | 1.3742 | 0.17% |
| WILLIAMS COS INC | Ind Group 1 | 0.13% | 1.25 | 0.09% | 1.193 | 1.1250 | 0.10% |
| NORTHERN TRUST COR | Ind Group 8 | 0.13% | 1.25 | 0.09% | 1.918 | 1.4150 | 0.12% |
| CHUBB CORP | Ind Group 8 | 0.13% | 1.75 | 0.12% | 1.516 | 0.5000 | 0.06% |
| WASTE MANAGEMENT I | Ind Group 2 | 0.13% | 1.25 | 0.08% | 0.748 | 0.0000 | 0.00% |
| ALLERGAN INC | Ind Group 5 | 0.13% | 1.25 | 0.08% | 1.98 | 1.4150 | 0.12% |
| PEABODY ENERGY COR | Ind Group 1 | 0.12% | 1.25 | 0.08% | 1.108 | 1.1250 | 0.09% |
| STAPLES INC | Ind Group 9 | 0.12% | 1.25 | 0.08% | 2.06 | 1.8000 | 0.15% |
| LAS VEGAS SANDS CO | Ind Group 9 | 0.12% | 1.25 | 0.08% | 1.17 | 0.0000 | 0.00% |
| YUM! BRANDS INC | Ind Group 9 | 0.12% | 1.25 | 0.08% | 1.243 | 0.5000 | 0.04% |
| NUCOR CORP | Ind Group 10 | 0.12% | 1.25 | 0.08% | 1.313 | 1.2500 | 0.10% |
| VIACOM INC-CLASS B | Ind Group 9 | 0.12% | 1.25 | 0.08% | 1.713 | 1.2384 | 0.10% |
| CAPITAL ONE FINANC | Ind Group 8 | 0.12% | 1.75 | 0.11% | 1.606 | 1.1250 | 0.13% |
| BB&T CORP | Ind Group 8 | 0.12% | 1.75 | 0.11% | 1.4 | 0.0000 | 0.00% |
| ARCHER-DANIELS-MID | Ind Group 4 | 0.12% | 1.75 | 0.11% | 1.204 | 0.0000 | 0.00% |
| PPL CORPORATION | Ind Group 11 | 0.12% | 1.25 | 0.08% | 0.955 | 0.8000 | 0.06% |
| MARSH & MCLENNAN C | Ind Group 8 | 0.12% | 1.25 | 0.08% | 1.503 | 0.5000 | 0.04% |
| ZIMMER HOLDINGS IN | Ind Group 5 | 0.12% | 1.25 | 0.08% | N/A | 1.1250 | 0.09% |
| AMERICAN TOWER COR | Ind Group 6 | 0.12% | 1.25 | 0.08% | 1.308 | 1.1992 | 0.10% |
| SPECTRA ENERGY COR | Ind Group 1 | 0.12% | 1.25 | 0.08% | 1.178 | 1.1250 | 0.09% |
| MCKESSON CORP | Ind Group 5 | 0.12% | 1.25 | 0.08% | 1.5 | 0.8000 | 0.06% |
| HJ HEINZ CO | Ind Group 4 | 0.11% | 1.25 | 0.08% | 1.82 | 1.8000 | 0.14% |
| AMERICAN ELECTRIC | Ind Group 11 | 0.11% | 1.25 | 0.08% | 1.208 | 1.2413 | 0.10% |
| ST JUDE MEDICAL IN | Ind Group 5 | 0.11% | 1.25 | 0.08% | 1.45 | 0.5000 | 0.04% |
| PACCAR INC | Ind Group 2 | 0.11% | 1.25 | 0.08% | 1.49 | 0.8565 | 0.07% |
| UNITED STATES STEE | Ind Group 10 | 0.11% | 1.25 | 0.08% | 1.235 | 1.1250 | 0.09% |
| ELECTRONIC ARTS IN | Ind Group 3 | 0.11% | 1.25 | 0.07% | 1.45 | 0.0000 | 0.00% |
| TYCO ELECTRONICS L | Ind Group 3 | 0.11% | 1.75 | 0.10% | N/A | 1.1250 | 0.12% |
| REYNOLDS AMERICAN | Ind Group 4 | 0.11% | 1.75 | 0.10% | 1.45 | 0.8000 | 0.09% |
| T ROWE PRICE GROUP | Ind Group 8 | 0.11% | 1.25 | 0.07% | 1.556 | 0.8000 | 0.06% |
| DIAMOND OFFSHORE D | Ind Group 1 | 0.11% | 1.25 | 0.07% | 1.188 | 1.1250 | 0.08% |

Figure 3D

| | | | | | | | |
|---|---|---|---|---|---|---|---|
| TJX COMPANIES INC | Ind Group 9 | 0.11% | 1.25 | 0.07% | 1.5 | 0.8000 | 0.06% |
| KOHLS CORP | Ind Group 9 | 0.11% | 1.25 | 0.07% | 1.585 | 1.1250 | 0.08% |
| EDISON INTERNATION | Ind Group 11 | 0.11% | 1.25 | 0.07% | 1.284 | 1.2500 | 0.09% |
| MURPHY OIL CORP | Ind Group 1 | 0.11% | 1.25 | 0.07% | N/A | 1.1250 | 0.08% |
| P G & E CORP | Ind Group 11 | 0.11% | 1.25 | 0.07% | 1.13 | 1.1250 | 0.08% |
| SUNTRUST BANKS INC | Ind Group 8 | 0.11% | 1.75 | 0.10% | 1.402 | 0.0000 | 0.00% |
| BIOGEN IDEC INC | Ind Group 5 | 0.11% | 1.25 | 0.07% | 1.452 | 0.5000 | 0.04% |
| PRECISION CASTPART | Ind Group 2 | 0.10% | 1.25 | 0.07% | 1.258 | 0.5000 | 0.04% |
| FLUOR CORP | Ind Group 2 | 0.10% | 1.25 | 0.07% | 1.38 | 0.5000 | 0.04% |
| SEMPRA ENERGY | Ind Group 11 | 0.10% | 1.25 | 0.07% | 1.355 | 1.4150 | 0.10% |
| GAP INC/THE | Ind Group 9 | 0.10% | 1.25 | 0.07% | 1.673 | 1.1250 | 0.08% |
| SMITH INTERNATIONA | Ind Group 1 | 0.10% | 1.25 | 0.07% | 1.278 | 1.2500 | 0.09% |
| JUNIPER NETWORKS I | Ind Group 3 | 0.10% | 1.25 | 0.07% | N/A | 1.1250 | 0.08% |
| LIBERTY MEDIA CORP | Ind Group 9 | 0.10% | 1.25 | 0.07% | N/A | 1.1250 | 0.08% |
| CAMPBELL SOUP CO | Ind Group 4 | 0.10% | 1.25 | 0.07% | 1.256 | 0.0000 | 0.00% |
| MCGRAW-HILL COMPAN | Ind Group 9 | 0.10% | 1.25 | 0.07% | 1.85 | 1.4150 | 0.09% |
| NOBLE CORP | Ind Group 1 | 0.10% | 1.25 | 0.07% | 1.543 | 1.8000 | 0.12% |
| OMNICOM GROUP | Ind Group 9 | 0.10% | 1.25 | 0.06% | 1.713 | 1.2500 | 0.08% |
| CUMMINS INC | Ind Group 2 | 0.10% | 1.25 | 0.06% | 1.968 | 1.8000 | 0.12% |
| AON CORP | Ind Group 8 | 0.10% | 1.75 | 0.09% | N/A | 1.1250 | 0.10% |
| SOUTHWESTERN ENER | Ind Group 1 | 0.10% | 1.25 | 0.06% | 1.345 | 1.4150 | 0.09% |
| LINCOLN NATIONAL C | Ind Group 8 | 0.10% | 1.75 | 0.09% | 1.534 | 0.8000 | 0.07% |
| L-3 COMMUNICATIONS | Ind Group 2 | 0.09% | 1.75 | 0.08% | N/A | 1.1250 | 0.10% |
| AGILENT TECHNOLOGI | Ind Group 3 | 0.09% | 1.25 | 0.06% | 2.07 | 1.4150 | 0.09% |
| PROGRESSIVE CORP | Ind Group 8 | 0.09% | 1.25 | 0.06% | 1.786 | 1.2500 | 0.08% |
| CONSOL ENERGY INC | Ind Group 1 | 0.09% | 1.25 | 0.06% | 0.908 | 0.8000 | 0.05% |
| CA INC | Ind Group 3 | 0.09% | 1.25 | 0.06% | 1.55 | 0.5000 | 0.03% |
| NOBLE ENERGY INC | Ind Group 1 | 0.09% | 1.75 | 0.08% | 1.051 | 1.1250 | 0.10% |
| PAYCHEX INC | Ind Group 3 | 0.09% | 1.25 | 0.06% | 1.45 | 0.0000 | 0.00% |
| EATON CORP | Ind Group 2 | 0.09% | 1.25 | 0.06% | N/A | 1.1250 | 0.07% |
| XEROX CORP | Ind Group 3 | 0.09% | 1.75 | 0.08% | 2.285 | 1.8000 | 0.15% |
| TD AMERITRADE HOLD | Ind Group 8 | 0.09% | 1.25 | 0.06% | 1.597 | 1.1250 | 0.07% |
| CONSTELLATION ENER | Ind Group 11 | 0.09% | 1.25 | 0.06% | 1.155 | 1.1250 | 0.07% |
| PRINCIPAL FINANCIA | Ind Group 8 | 0.09% | 1.75 | 0.08% | 1.516 | 0.8000 | 0.07% |
| EL PASO CORP | Ind Group 1 | 0.09% | 1.25 | 0.06% | 0.65 | 0.0000 | 0.00% |
| WEYERHAEUSER CO | Ind Group 10 | 0.09% | 1.75 | 0.08% | 1.73 | 1.8000 | 0.14% |
| SEARS HOLDINGS COR | Ind Group 9 | 0.08% | 1.75 | 0.08% | 1.385 | 0.5000 | 0.04% |
| ITT CORP | Ind Group 2 | 0.08% | 1.25 | 0.06% | 1.908 | 1.8000 | 0.10% |
| INTERNATIONAL PAPE | Ind Group 10 | 0.08% | 1.75 | 0.08% | 1.7 | 1.8000 | 0.14% |
| CIGNA CORP | Ind Group 5 | 0.08% | 1.25 | 0.06% | 1.463 | 0.8000 | 0.05% |
| SAFEWAY INC | Ind Group 4 | 0.08% | 1.75 | 0.08% | 1.515 | 1.1250 | 0.09% |
| INTUITIVE SURGICAL | Ind Group 5 | 0.08% | 1.25 | 0.06% | 1.47 | 0.8000 | 0.05% |
| NEWS CORP-CLASS B | Ind Group 9 | 0.08% | 1.75 | 0.08% | N/A | 1.1250 | 0.09% |
| PROGRESS ENERGY IN | Ind Group 11 | 0.08% | 1.25 | 0.05% | 1.105 | 1.1250 | 0.06% |
| STARBUCKS CORP | Ind Group 9 | 0.08% | 1.25 | 0.05% | 1.74 | 1.2500 | 0.07% |
| ECOLAB INC | Ind Group 10 | 0.08% | 1.25 | 0.05% | 1.598 | 1.4150 | 0.08% |
| SOUTHWEST AIRLINES | Ind Group 2 | 0.08% | 1.75 | 0.08% | 1.38 | 0.8000 | 0.06% |
| CONSOLIDATED EDISO | Ind Group 11 | 0.08% | 1.25 | 0.05% | 1.685 | 1.8000 | 0.10% |
| LEHMAN BROTHERS HO | Ind Group 8 | 0.08% | 3.75 | 0.16% | 1.519 | 0.8000 | 0.13% |
| MEMC ELECTRONIC MA | Ind Group 3 | 0.08% | 1.75 | 0.07% | 1.704 | 0.8000 | 0.06% |
| FOREST LABORATORIE | Ind Group 5 | 0.08% | 1.75 | 0.07% | 1.484 | 0.8000 | 0.06% |
| BUNGE LTD | Ind Group 4 | 0.08% | 3.75 | 0.16% | 1.042 | 0.0000 | 0.00% |

Figure 3E

Comparison of US Core 1 and US Sustainability Core 1

Size and Value Tilts

US Core 1

|  | Neg/NA | Low | 3 | 4 | 5 | High |  |
|---|---|---|---|---|---|---|---|
| Large | 4.20% | 12.72% | 9.88% | 7.55% | 9.20% | 9.30% | 52.84% |
| 2 | 1.30% | 2.40% | 2.94% | 3.54% | 3.98% | 4.30% | 18.46% |
| 3 | 1.19% | 1.23% | 1.85% | 2.65% | 3.32% | 3.01% | 13.25% |
| 4 | 0.66% | 0.83% | 0.93% | 1.75% | 3.31% | 2.46% | 9.95% |
| 5 | 0.13% | 0.27% | 0.34% | 0.48% | 1.05% | 1.39% | 3.66% |
| Small | 0.06% | 0.08% | 0.09% | 0.18% | 0.45% | 0.99% | 1.84% |
|  | 7.53% | 17.54% | 16.03% | 16.15% | 21.32% | 21.45% | 100.00% |

US Sustainability Core 1

|  | Neg/NA | Low | 3 | 4 | 5 | High |  |
|---|---|---|---|---|---|---|---|
| Large | 2.66% | 14.49% | 9.38% | 8.42% | 10.96% | 11.56% | 57.47% |
| 2 | 1.50% | 2.16% | 2.76% | 3.58% | 3.82% | 3.63% | 17.44% |
| 3 | 1.20% | 0.98% | 1.61% | 2.37% | 2.99% | 2.83% | 11.97% |
| 4 | 0.78% | 0.68% | 0.70% | 1.35% | 2.57% | 2.06% | 8.14% |
| 5 | 0.14% | 0.23% | 0.28% | 0.41% | 0.79% | 1.14% | 2.99% |
| Small | 0.07% | 0.09% | 0.10% | 0.19% | 0.49% | 1.05% | 1.99% |
|  | 6.35% | 18.62% | 14.82% | 16.32% | 21.62% | 22.27% | 100.00% |

Number of Names

US Core 1

|  | Neg/NA | Low | 3 | 4 | 5 | High |  |
|---|---|---|---|---|---|---|---|
| Large | 33 | 55 | 49 | 36 | 37 | 37 | 247 |
| 2 | 34 | 60 | 76 | 64 | 47 | 52 | 333 |
| 3 | 31 | 55 | 52 | 81 | 80 | 71 | 370 |
| 4 | 46 | 91 | 69 | 119 | 189 | 153 | 667 |
| 5 | 26 | 78 | 63 | 91 | 164 | 221 | 643 |
| Small | 42 | 68 | 53 | 103 | 219 | 570 | 1,055 |
|  | 212 | 407 | 362 | 494 | 736 | 1,104 | 3,315 |

US Sustainability Core 1

|  | Neg/NA | Low | 3 | 4 | 5 | High |  |
|---|---|---|---|---|---|---|---|
| Large | 29 | 47 | 47 | 33 | 31 | 35 | 222 |
| 2 | 33 | 55 | 72 | 62 | 42 | 47 | 311 |
| 3 | 28 | 51 | 52 | 79 | 79 | 65 | 354 |
| 4 | 45 | 91 | 68 | 115 | 182 | 150 | 651 |
| 5 | 26 | 77 | 63 | 91 | 162 | 217 | 636 |
| Small | 42 | 68 | 52 | 103 | 217 | 569 | 1,051 |
|  | 203 | 389 | 354 | 483 | 713 | 1,083 | 3,225 |

Unbiased allocation across the market capitalization and value/growth dimensions.

Source: Dimensional Fund Advisors
Data as of November 30, 2007.

Figure 4B

Comparison of US Core 1 and US Sustainability Core 1

|  | Sustainability Core 1 | Core 1 | Market |
|---|---|---|---|
| Average Weighted Total Capitalization | 64,647 | 64,222 | 89,544 |
| Average Weighted Book-to-Market | 0.46 | 0.46 | 0.40 |
| Geometric Weighted Total Capitalization | 18,254 | 15,380 | 32,570 |
| Geometric Weighted Book-to-Market | 0.37 | 0.37 | 0.32 |

|  | SUSTAINABILITY CORE 1 | | CORE 1 | |
|---|---|---|---|---|
|  | Weight | Sustainability Z-Score | Weight | Sustainability Z-Score |
| Consumer Discretionary | 12.90% | 0.24 | 12.44% | -0.11 |
| Consumer Staples | 7.77% | 0.31 | 8.10% | -0.18 |
| Energy | 10.22% | 0.63 | 10.10% | 0.11 |
| Financials | 18.95% | 0.26 | 18.49% | -0.14 |
| Health Care | 11.02% | 0.19 | 11.58% | -0.20 |
| Industrials | 12.07% | 0.24 | 12.47% | -0.19 |
| Information Technology | 15.09% | 0.24 | 15.45% | -0.22 |
| Materials | 5.26% | 0.35 | 4.80% | 0.01 |
| Telecommunication Services | 2.53% | 0.90 | 2.82% | 0.21 |
| Utilities | 4.20% | 0.51 | 3.76% | 0.11 |
| Total | 100.0% | 0.32 | 100.00% | -0.11 |

| | |
|---|---|
| Excluded Market Capitalization | 20.45% |
| Securities Excluded | 90 |

Increased exposure to small and value companies.

Unbiased allocation across industries.

Source: Dimensional Fund Advisors
Data as of November 30, 2007.

Figure 4C

Industry Sector Allocation along the Sustainability Dimension

Core 1 in Sustainability Industry-Adjusted Grids

|  | Bottom 10% (Bad) | 10%-25% | 25%-40% | 40%-60% | 60%-75% | 75%-90% | Top 10% (Good) |
|---|---|---|---|---|---|---|---|
| Consumer Discretionary | 12.44% | 0.6% | 2.8% | 1.7% | 3.5% | 1.8% | 1.4% | 0.6% |
| Consumer Staples | 8.10% | 0.6% | 2.0% | 1.7% | 1.6% | 0.7% | 1.4% | 0.2% |
| Energy | 10.10% | 2.3% | 0.0% | 0.9% | 3.0% | 1.7% | 1.5% | 0.6% |
| Financials | 18.49% | 0.8% | 4.6% | 3.4% | 3.9% | 2.2% | 2.2% | 1.3% |
| Health Care | 11.58% | 1.0% | 2.7% | 2.3% | 2.9% | 0.9% | 1.7% | 0.2% |
| Industrials | 12.47% | 0.7% | 3.1% | 2.6% | 2.7% | 2.6% | 0.0% | 0.7% |
| Information Technology | 15.45% | 1.1% | 4.4% | 2.3% | 3.4% | 1.8% | 1.4% | 1.1% |
| Materials | 4.80% | 0.2% | 0.8% | 0.7% | 1.5% | 0.7% | 0.6% | 0.3% |
| Telecommunication Services | 2.82% | 1.0% | 0.0% | 0.0% | 0.8% | 0.4% | 0.7% | 0.0% |
| Utilities | 3.76% | 0.3% | 0.4% | 0.6% | 1.0% | 0.5% | 0.7% | 0.3% |
| US Core 1 | 100.00% | 8.47% | 20.80% | 16.19% | 24.36% | 13.21% | 11.65% | 5.33% |
| US Sustainability Core 1 |  | 0.00% | 11.10% | 13.87% | 29.34% | 17.92% | 17.47% | 10.27% |
| US Market |  | 10.53% | 16.70% | 14.17% | 22.43% | 15.25% | 14.31% | 6.66% |

Gradual penalization/reward of companies based on their industry-adjusted sustainability score.

Figure 4D

Source: Dimensional Fund Advisors
Data as of November 30, 2007.

Comparison of International Core 1 and International Sustainability Core 1

Size and Value Tilts

International Core 1

| | Neg/NA | Low | 3 | 4 | High | |
|---|---|---|---|---|---|---|
| Large | 1.89% | 9.29% | 7.95% | 8.51% | 12.25% | 39.88% |
| 2 | 1.67% | 4.97% | 3.31% | 6.45% | 9.08% | 25.48% |
| 3 | 1.09% | 3.20% | 3.05% | 2.92% | 5.72% | 15.98% |
| 4 | 0.42% | 2.39% | 2.42% | 2.24% | 6.09% | 13.56% |
| 5 | 0.12% | 0.62% | 0.57% | 0.74% | 3.06% | 5.10% |
| Small | 5.19% | 20.45% | 17.29% | 20.86% | 36.21% | 100.00% |

International Sustainability Core 1

| | Neg/NA | Low | 3 | 4 | High | |
|---|---|---|---|---|---|---|
| Large | 1.86% | 9.55% | 7.63% | 8.08% | 14.55% | 41.67% |
| 2 | 1.73% | 4.46% | 3.27% | 6.04% | 8.65% | 24.15% |
| 3 | 0.93% | 2.72% | 2.99% | 2.60% | 5.09% | 14.34% |
| 4 | 0.41% | 2.47% | 2.65% | 2.33% | 6.30% | 14.16% |
| 5 | 0.14% | 0.70% | 0.64% | 0.82% | 3.40% | 5.69% |
| Small | 5.07% | 19.90% | 17.18% | 19.87% | 37.98% | 100.00% |

Number of Names

International Core 1

| | Neg/NA | Low | 3 | 4 | High | |
|---|---|---|---|---|---|---|
| Large | 18 | 74 | 46 | 44 | 54 | 236 |
| 2 | 41 | 108 | 68 | 80 | 96 | 393 |
| 3 | 35 | 135 | 98 | 86 | 159 | 513 |
| 4 | 33 | 281 | 211 | 216 | 604 | 1,345 |
| 5 | 80 | 373 | 288 | 340 | 1,794 | 2,875 |
| Small | 207 | 971 | 711 | 766 | 2,707 | 5,362 |

International Sustainability Core 1

| | Neg/NA | Low | 3 | 4 | High | |
|---|---|---|---|---|---|---|
| Large | 16 | 66 | 42 | 38 | 48 | 210 |
| 2 | 36 | 89 | 64 | 64 | 80 | 333 |
| 3 | 30 | 113 | 87 | 75 | 134 | 439 |
| 4 | 31 | 267 | 206 | 208 | 581 | 1,293 |
| 5 | 80 | 371 | 287 | 337 | 1,781 | 2,856 |
| Small | 193 | 906 | 686 | 722 | 2,624 | 5,131 |

Unbiased allocation across the market capitalization and value/growth dimensions.

Source: Dimensional Fund Advisors
Data as of November 30, 2007.

Figure 4E

Comparison of International Core 1 and International Sustainability Core 1

| | Sustainability Core 1 | Core 1 | Market |
|---|---|---|---|
| Average Weighted Total Capitalization | 44,208 | 42,782 | 60,676 |
| Average Weighted Book-to-Market | 0.51 | 0.50 | 0.44 |
| Geometric Weighted Total Capitalization | 13,780 | 13,577 | 26,719 |
| Geometric Weighted Book-to-Market | 0.42 | 0.41 | 0.37 |

Increased exposure to small and value companies.

Unbiased allocation across industries.

| | SUSTAINABILITY CORE 1 | | CORE 1 | |
|---|---|---|---|---|
| | Weight | Sustainability Z-Score | Weight | Sustainability Z-Score |
| Consumer Discretionary | 13.66% | 0.39 | 13.65% | -0.11 |
| Consumer Staples | 6.66% | 0.41 | 7.01% | -0.18 |
| Energy | 6.76% | 0.48 | 7.00% | -0.04 |
| Financials | 26.52% | 0.44 | 25.82% | -0.02 |
| Health Care | 4.58% | 0.42 | 5.08% | -0.21 |
| Industrials | 16.34% | 0.39 | 15.72% | -0.07 |
| Information Technology | 6.34% | 0.37 | 6.27% | -0.10 |
| Materials | 11.59% | 0.33 | 11.59% | -0.19 |
| Telecommunication Services | 3.79% | 0.55 | 4.03% | 0.00 |
| Utilities | 3.76% | 0.50 | 3.84% | -0.04 |
| Total | 100.00% | 0.42 | 100.00% | -0.08 |

| Excluded Market Capitalization* | 17.40% |
|---|---|
| Securities Excluded | 240 |

Figure 4F

Source: Dimensional Fund Advisors
*Excludes 21.75% of market capitalization of companies with score.
Data as of November 30, 2007.

Comparison of International Core 1 and International Sustainability Core 1

| | Sustainability Core 1 | Core 1 | | Sustainability Core 1 | Core 1 |
|---|---|---|---|---|---|
| Australia | 5.8% | 6.0% | UK | 19.3% | 18.3% |
| New Zealand | 0.2% | 0.2% | Switzerland | 6.6% | 6.6% |
| Japan | 20.0% | 20.7% | | | |
| Hong Kong | 2.1% | 2.5% | Canada | 7.9% | 7.8% |
| Singapore | 1.1% | 1.4% | | | |
| Austria | 0.5% | 0.7% | Denmark | 0.9% | 1.1% |
| Belgium | 1.0% | 1.1% | Finland | 1.8% | 1.9% |
| Germany | 8.2% | 7.4% | Norway | 0.9% | 0.9% |
| Spain | 4.2% | 3.9% | Sweden | 2.2% | 2.5% |
| France | 8.7% | 8.2% | | | |
| Greece | 0.8% | 1.0% | • Internationally diversified. | | |
| Italy | 3.4% | 3.2% | • Unbiased allocation across countries. | | |
| Ireland | 0.7% | 0.9% | | | |
| Netherlands | 3.2% | 3.2% | | | |
| Portugal | 0.3% | 0.4% | | | |

Source: Dimensional Fund Advisors
Data as of November 30, 2007.

Figure 4G

Industry Sector Allocation along the Sustainability Dimension

International Core 1 in Sustainability Industry-Adjusted Grids

|  | Bottom 10% (Bad) 10%-25% | 25%-40% | 40%-60% | 60%-75% | 75%-90% | Top 10% (Good) |
|---|---|---|---|---|---|---|
| Consumer Discretionary | 13.65% | 1.3% | 1.8% | 1.1% | 6.1% | 1.2% | 1.6% | 0.6% |
| Consumer Staples | 7.01% | 0.9% | 0.8% | 1.0% | 2.7% | 0.7% | 0.6% | 0.3% |
| Energy | 7.00% | 0.6% | 1.3% | 0.6% | 2.6% | 0.8% | 1.1% | 0.1% |
| Financials | 25.82% | 2.2% | 3.1% | 3.3% | 9.4% | 3.1% | 3.0% | 1.8% |
| Health Care | 5.08% | 0.7% | 0.9% | 0.3% | 2.3% | 0.5% | 0.2% | 0.1% |
| Industrials | 15.72% | 1.2% | 1.5% | 1.4% | 8.2% | 1.4% | 1.6% | 0.6% |
| Information Technology | 6.27% | 0.5% | 0.6% | 0.9% | 2.8% | 1.0% | 0.0% | 0.5% |
| Materials | 11.59% | 1.0% | 1.2% | 1.2% | 5.9% | 1.6% | 0.3% | 0.5% |
| Telecommunication Services | 4.03% | 0.5% | 1.1% | 0.0% | 0.9% | 1.2% | 0.0% | 0.3% |
| Utilities | 3.84% | 0.6% | 0.2% | 0.5% | 1.6% | 0.3% | 0.5% | 0.2% |
| International Core 1 | 100.00% | 9.4% | 12.3% | 10.4% | 42.4% | 11.6% | 8.9% | 4.9% |
| Sustainability Core 1 |  | 0.0% | 6.3% | 8.4% | 48.6% | 15.0% | 12.7% | 9.0% |
| US Market |  | 8.9% | 13.7% | 12.1% | 34.8% | 14.0% | 10.4% | 6.0% |

Gradual penalization/reward of companies based on their industry-adjusted sustainability score.

Source: Dimensional Fund Advisors
Data as of November 30, 2007.

| Name | Total Market Cap ($Bn) | Revenue ($Bn) | GIC Code | Overall Score (0-3) | Overall Quintile (1-5) |
|---|---|---|---|---|---|
| EXXON MOBIL CORP | 499.6 | 335.1 | 10102010 | 0.806 | 1 |
| GENERAL ELECTRIC CO | 376.6 | 160.9 | 20105010 | 1.769 | 5 |
| MICROSOFT CORP | 323.2 | 51.1 | 45103020 | 1.894 | 5 |
| AT&T INC | 235.4 | 63.1 | 50101020 | 1.134 | 1 |
| PROCTER & GAMBLE CO | 230.4 | 76.5 | 30301010 | 1.566 | 4 |
| GOOGLE INC-CL A | 223.8 | 10.6 | 45101010 | 1.550 | 4 |
| BANK OF AMERICA CORP | 204.0 | 116.3 | 40201020 | 1.815 | 5 |
| WAL-MART STORES INC | 197.3 | 348.7 | 30101040 | 1.409 | 2 |
| JOHNSON & JOHNSON | 195.5 | 53.3 | 35202010 | 2.080 | 5 |
| CHEVRON CORP | 192.9 | 195.3 | 10102010 | 1.409 | 2 |
| CITIGROUP INC | 171.1 | 146.6 | 40201020 | 2.046 | 5 |
| CISCO SYSTEMS INC | 168.6 | 34.9 | 45201020 | 1.994 | 5 |
| APPLE INC | 166.4 | 24.0 | 45202010 | 1.893 | 5 |
| PFIZER INC | 165.1 | 48.4 | 35202010 | 1.779 | 5 |
| ALTRIA GROUP INC | 163.9 | 70.3 | 30203010 | 1.463 | 2 |
| INTEL CORP | 163.6 | 35.4 | 45301020 | 1.739 | 5 |
| AMERICAN INTERNATION | 155.6 | 113.2 | 40301030 | 1.830 | 4 |
| JPMORGAN CHASE & CO | 155.2 | 99.1 | 40201020 | 1.607 | 5 |
| INTL BUSINESS MACHIN | 151.2 | 91.4 | 45202010 | 2.159 | 4 |
| COCA-COLA CO/THE | 145.8 | 24.1 | 30201030 | 1.632 | 5 |
| HEWLETT-PACKARD CO | 135.1 | 104.3 | 45202010 | 2.124 | 1 |
| CONOCOPHILLIPS | 133.2 | 167.6 | 10102010 | 0.889 | 5 |
| MERCK & CO. INC. | 129.5 | 22.6 | 35202010 | 1.779 | 2 |
| VERIZON COMMUNICATIO | 128.4 | 88.1 | 50101020 | 1.338 | 4 |
| PEPSICO INC | 124.0 | 35.1 | 30201030 | 1.562 | 2 |
| SCHLUMBERGER LTD | 118.3 | 19.2 | 10101020 | 1.309 | 2 |
| ORACLE CORP | 109.7 | 18.0 | 45103020 | 1.430 | 5 |
| WELLS FARGO & COMPAN | 109.3 | 48.0 | 40101010 | 1.981 | 3 |
| GOLDMAN SACHS GROUP | 94.7 | 69.4 | 40203020 | 1.540 | 2 |
| WACHOVIA CORP | 87.1 | 46.8 | 40101010 | 1.448 | 4 |
| UNITED PARCEL SERVIC | 77.6 | 47.5 | 20301010 | 1.629 | 5 |
| UNITED TECHNOLOGIES | 77.1 | 47.8 | 20101010 | 1.912 | 5 |

What the Scores Represent

| Score | Overall | Environmental Vulnerability* | Environmental Strength** |
|---|---|---|---|
| 0 | The Worst Score | Major Problems | No Program |
| 1 | Intermediate (Low) | Moderate Problems | Weak Program |
| 2 | Intermediate (High) | Minor Problems | Moderately Strong Program |
| 3 | The Best Score | No Problems | Top-Tier Program |
| NA | No Data. Weighting disbursed to other subscore variables | No Data. Weighting disbursed to other subscore variables | No Data. Weighting disbursed to other subscore variables |

*Includes Carbon Intensity & Sector-Normalized Carbon Intensity

**Includes Carbon Reporting, Climate Change Solutions Users, and Beneficial Products & Services

COMPUTER-IMPLEMENTED METHOD AND APPARATUS FOR SELECTING AN INVESTMENT PORTFOLIO AND ADMINISTERING AN INVESTMENT COMPANY BASED IN PART ON SOCIALLY RESPONSIBLE INVESTING CONSIDERATIONS

CROSS-REFERENCE TO RELATED APPLICATIONS

This application is a continuation of copending U.S. application Ser. No. 12/261,535 filed Oct. 30, 2008, the entire disclosure of which is incorporated herein by reference.

BACKGROUND OF THE INVENTION

A growing number of people are looking for ways to align their investment choices with their personal philosophies about environmental sustainability and other social issues. Sustainability-concerned investors and socially conscious investors embrace the idea that everyone has a responsibility for the environment and social issues. Money managers are responding to this trend by incorporating environmental factors and social issues into their investment strategies. However, socially responsible investing (SRI) funds in the market today generally are designed to accumulate companies that pass a given screen, rather than to achieve specific investment goals. Accordingly, there is an unmet need for SRI funds that are focused on specific investment goals, while still addressing SRI concerns. The present invention fulfills such a need.

BRIEF SUMMARY OF THE INVENTION

A computer-implemented method is provided for selecting a recommended investment portfolio based in part on socially responsible considerations. A portfolio of securities is identified for potential inclusion in the recommended investment portfolio. Socially responsible investing (SRI) scores are provided for the identified securities, and the identified securities are ranked relative to each other based on their SRI scores in a computerized ranking engine. A processor receives an entry of initial weightings for each of the identified securities, or data by which initial weightings for each of the identified securities can be objectively calculated; the ranking of the identified securities based on their SRI scores; and an SRI multiplier algorithm that is correlated with the relative ranking. The initial weightings or the data are unadjusted by socially responsible considerations. The processor uses a weighting calculation engine to calculate adjusted weightings for the portfolio of securities using at least the entered items. Securities having higher ranked SRI scores relative to other securities receive greater weightings, and the weightings include non-binary weightings. The processor outputs the adjusted weightings for the portfolio of securities. The adjusted weightings are used to select the recommended investment portfolio based in part on socially responsible considerations. The recommended investment portfolio may also be used to manage an investment company that selects securities based in part on environmental impact considerations.

In another preferred embodiment, an investment company continuously manages its portfolio of securities based on the recommended investment portfolio.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown.

In the drawings:

FIGS. 3A-3E, taken together, shows a spreadsheet of how a portfolio of securities is tilted towards sustainability-friendly companies in accordance with one preferred embodiment of the present invention.

FIGS. 4B-4H show comparisons between portfolios with sustainability overlays vs. portfolios without such overlays and industry sector allocations in accordance with a preferred embodiment of the present invention.

FIG. 5A shows environmental impact scores for a sample of securities.

FIG. 5B shows the meaning of certain subscore ratings that determine the environment impact scores shown in FIG. 5A.

DETAILED DESCRIPTION OF THE INVENTION

Certain terminology is used herein for convenience only and is not to be taken as a limitation on the present invention.

I. DEFINITIONS

The following definitions are provided to promote understanding of the present invention.

SRI score or sustainability score—The Socially Responsible Investing (SRI) score is a score assigned by a rating organization to a company, or derived from rating information obtained from a rating organization. The SRI score may be specific to a particular concern. One such SRI score related to environmental concerns is an environmental impact score, or EIS score. One preferred embodiment of the present invention uses EIS scores. SRI scores may also be specific to social issues or corporate governance, or combinations thereof, and such scores are within the scope of the present invention. The SRI score is also interchangeably referred to herein as a "sustainability score."

SRI multiplier—An SRI multiplier adjusts the weighting of a security for SRI issues.

Sustainable Z-score—The sustainable Z-score (shown in FIG. 4A) is a mapping of the sector-by-sector market cap weighted SRI score, mapped into a normal distribution (a normal distribution with a mean of 0, and a standard deviation of 1). It is the method by which the raw company SRI scores are normalized and weighted by sector, and then assigned a relevant SRI multiplier.

non-binary weightings—Non-binary weightings are weightings other than "1" and "0." Weightings can be more or less than 1, and greater than "0." Weightings can also be equal to "1" and "0."

II. OVERVIEW OF PRESENT INVENTION

Figure 1:
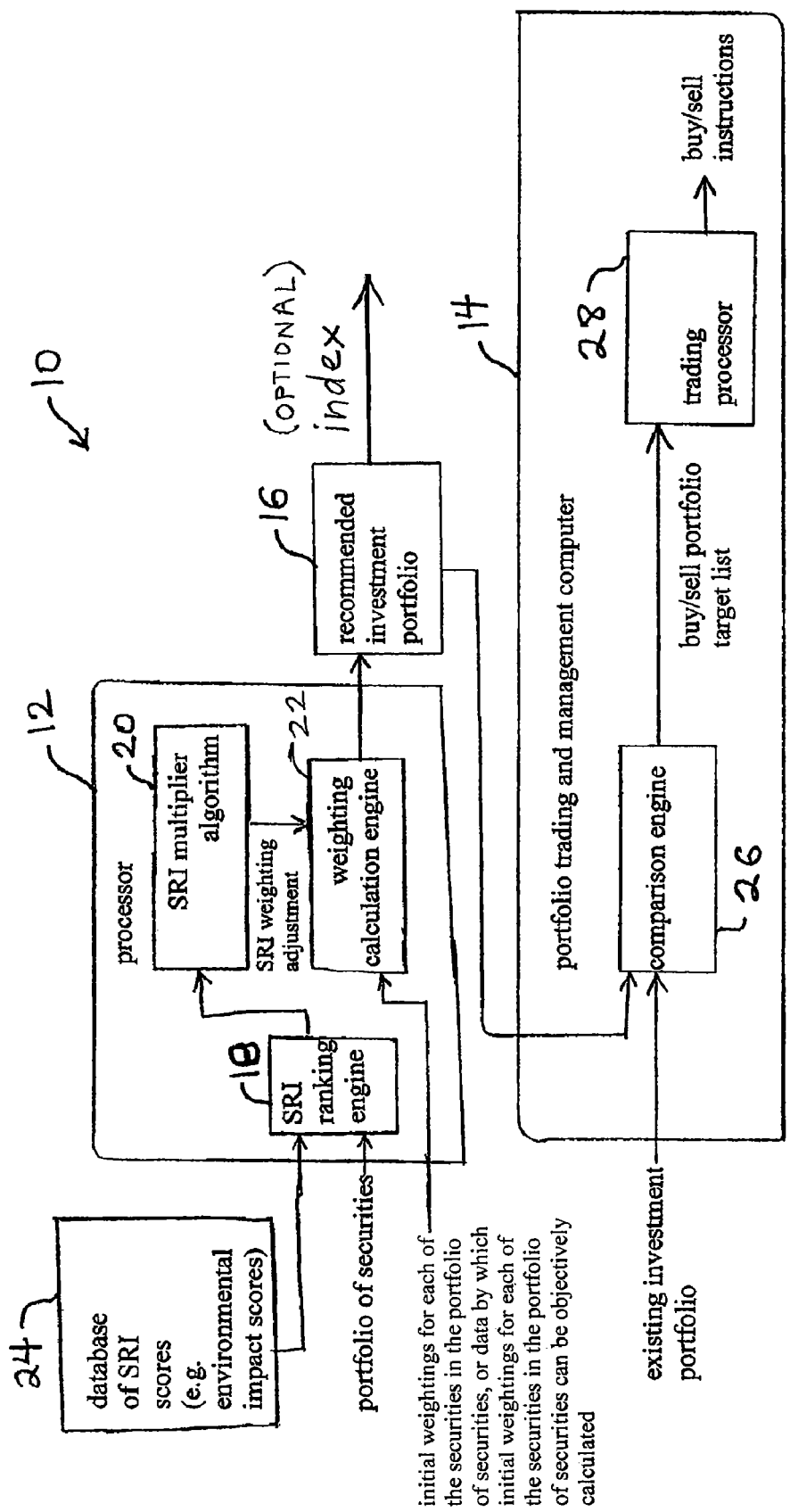
FIG. 1 is a schematic block diagram of a system that implements one preferred embodiment of the present invention.

FIG. 1 is a schematic block diagram of a system 10 that implements one preferred embodiment of the present invention. The system includes a processor 12 and a portfolio trading and management computer 14. The processor 12 and computer 14 may be separate components or may be part of the same computer system. In one implementation, a recommended investment portfolio 16 is created and provided to customers/clients, but no actual trading of securities occurs. In another implementation, the processor 12 and computer 14 are part of an investment company, and actual trading of securities occurs by the investment company. In both instances, the recommended investment portfolio 16 is periodically generated.

The processor 12 includes an SRI ranking engine 18, an SRI multiplier algorithm 20 and a weighting calculation engine 22. The SRI ranking engine 18 receives an input of SRI scores (e.g., EIS scores) from a database of SRI scores 24, and a portfolio of securities identified for potential inclusion in the investment portfolio. Ideally, all of the securities would have such a score, but scores may not be available for some of the securities. The treatment of securities without scores is discussed below. The SRI ranking engine 18 ranks the identified securities that have scores relative to each other based on their scores. In the preferred embodiment, each of the securities are defined by an industry sector, and the ranking is performed on an industry sector basis. The weighting calculation engine 22 receives the output of the SRI multiplier algorithm 20 and an initial weighting for each of the securities in the portfolio of securities identified for potential inclusion in the investment portfolio, or data by which initial weightings for each of the securities in the portfolio of securities identified for potential inclusion in the investment portfolio can be objectively calculated. The initial weightings or the data are unadjusted by socially responsible considerations. Using this information, the weighting calculation engine 22 calculates adjusted weightings for the portfolio of securities. Securities having higher ranked SRI scores relative to other securities receive greater weightings.

The initial weightings are either (a) based on pre-set weights from an outside source (such as an index), equally weighted, or based on other predetermined criteria, or (b) objectively calculated using data which is input for each security. Examples of (b) include, but are not limited to:

1. Market capitalization
2. Market capitalization with free-float adjustment
3. Graduated weighting based on book-to-market ratio, price/earnings ratio, or other similar criteria
4. Other objective criteria by which initial weightings may be objectively calculated The sustainability weighting feature provides for non-binary weightings. The weightings thus do not merely indicate inclusion or exclusion of the securities, although a weighting of zero (i.e., an exclusion) may be applied to selected securities. The weightings preferably provide adjusted weightings that exclude, underweight, and overweight securities based on the relative rankings. More specifically, the adjusted weightings preferably exclude a predefined bottom percentage of relatively ranked securities from the recommended investment portfolio, underweight a predefined low to mid-ranked percentage of relatively ranked securities from the recommended investment portfolio, and overweight a predefined mid to high-ranked percentage of relatively ranked securities from the recommended investment portfolio. Percentages can be calculated in a variety of ways, including cumulative market-cap, number of securities, or combinations of these and other factors. One suitable range of adjusted weightings, from the bottom to the top, are as follows, using cumulative market caps:

1. bottom 10% are excluded
2. next 15% are weighted at 0.50×initial weighting
3. next 15% are weighted at 0.80×initial weighting
4. next 20% are weighted at 1.125×initial weighting
5. next 15% are weighted at 1.25×initial weighting
6. next 15% are weighted at 1.40×initial weighting
7. top 10% are weighted at 1.80×initial weighting As discussed above, the SRI scores may be retrieved by the processor 12 from a remote database 24 of such scores provided by a third party vendor/service provider. A neutral adjusted weighting may be assigned to any security that does not have an SRI score. This adjusted weighting would also preferably be made on an industry sector basis. In one preferred embodiment wherein the SRI score is an EIS score, the SRI (EIS) score is provided by Sustainable Holdings, Beverly Hills, Calif.

In an alternative embodiment of the present invention, an investment company uses the portfolio trading and management computer 14 to buy and sell securities so as to build and maintain a portfolio that closely matches the recommended investment portfolio 16. The computer 14 includes a comparison engine 26 and a trading processor 28. In operation, the process described above is periodically repeated with current SRI scores to generate a current recommended investment portfolio 16. The comparison engine 26 then compares the current recommended investment portfolio 16 with an existing investment portfolio and generates a buy/sell portfolio target list to bring the existing investment portfolio in line with the current recommended investment portfolio 16. The trading processor 28 then outputs suitable buy/sell trading instructions that are necessary to achieve that goal. A portfolio manager will then work with a broker/dealer to execute on the instructions. This process may still be performed even if the system 10 is used only for advising and not for operating an investment company. If so, then the buy/sell portfolio target list and the buy/sell instructions would be provided to the customers/clients who, in turn, would use them to decide whether to make the necessary trades for investment services that they provide to their own customers/clients.

To summarize, the process described above may be used for any of the following scenarios:

1. Create an initial recommended investment portfolio based on an inputted portfolio of securities and initial weightings (or data by which the initial weightings can be calculated, such as market-cap security weightings) for such securities. In this instance, there would be no existing investment portfolio.

2. Update an existing investment portfolio that was generated using the system. The updating may be for rebalancing (e.g., quarterly) or to adjust for actual and/or expected cash flows which can occur on a daily or less frequent basis (e.g., weekly). The current recommended investment portfolio 16 may then be compared to the previously generated investment portfolio to produce a buy/sell portfolio target list in the same manner as described above. A portfolio manager would decide when it is appropriate to perform such an update.

3. Create an SRI (e.g., sustainability) version of an existing portfolio. In one embodiment of this process, the inputted portfolio of securities and initial weightings for such securities would exactly match the holdings of the portfolio. When an update occurs, the newly inputted portfolio of securities and initial weightings would also exactly match the currently existing holdings of the portfolio. This approach allows the sustainability version to piggyback on the name recognition and investment goals of the non-sustainable portfolio.

Figure 2:
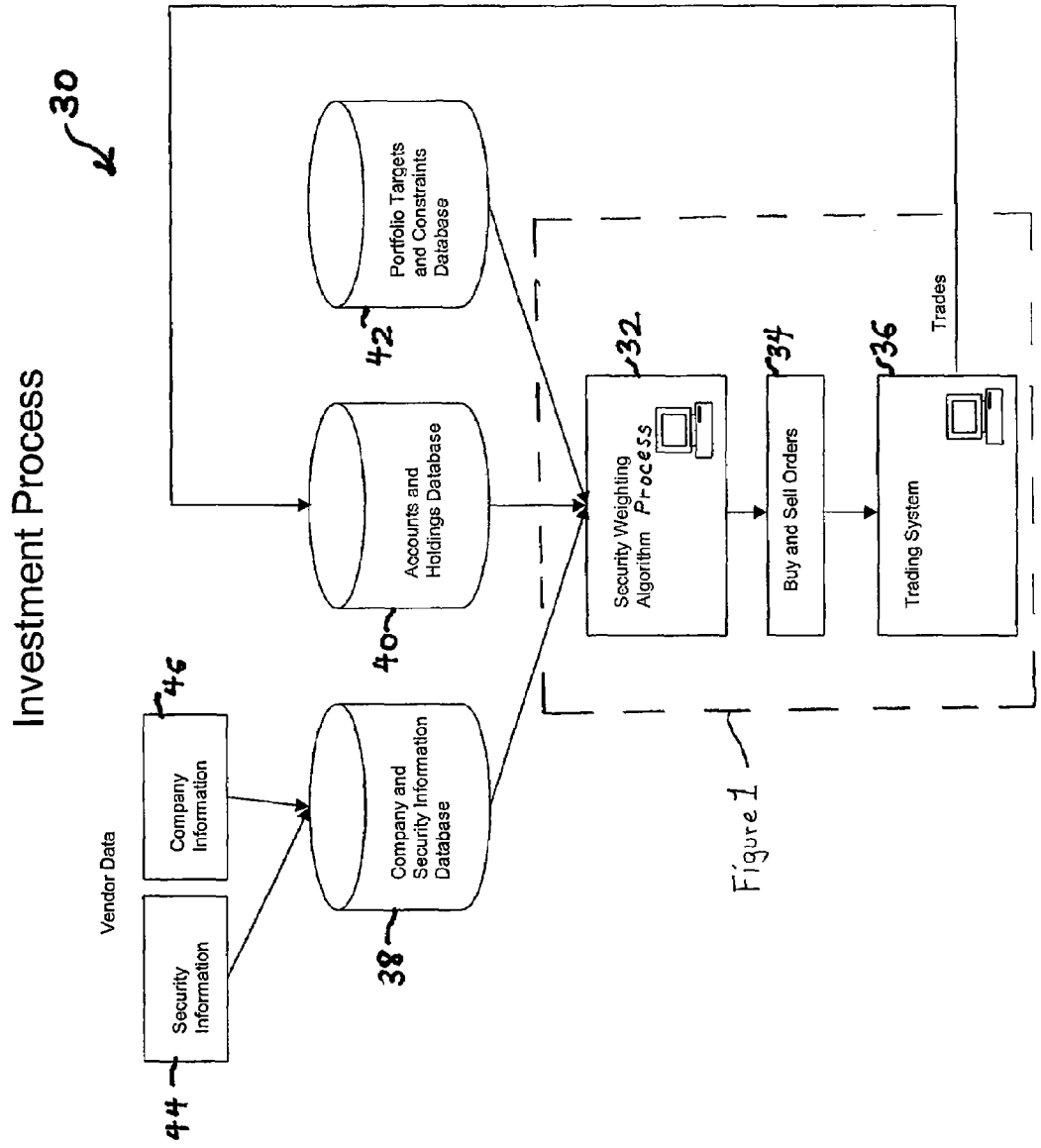
FIG. 2 is an overview of an investment process used with the FIG. 1 system.

FIG. 2 is a self-explanatory overview of an investment process 30. The apparatus for performing the security weighting algorithm process 32, buy and sell orders step 34, and trading system 36 of FIG. 2 are all shown in FIG. 1. FIG. 2 also shows various databases (company and security information database 38, accounts and holdings database 40, portfolio targets and constraints database 42) and sources of vendor data (security information 44, company information 46) for implementing the system of FIG. 1.

In all of the scenarios described above, a portfolio manager may also input constraints into the system, such as portfolio restrictions (e.g., ADR's, REIT's); minimum/maximum trade size, and target country weights for international strategies. Using these constraints, a software program then builds a database of all available securities that can be chosen for the portfolio.

Although not shown in FIG. 1, additional optimization variables may optionally be used to select the initial weightings (or the data by which initial weightings can be objectively calculated) inputted into the engine 22 or to revise the adjusted weightings outputted by the engine 22. In one scheme, the optimization variables are used to tilt the desired target portfolio towards small/value names. Such optimization variables include concentration factors for industry, countries, dividends, capital gains, ranges for overweighting, and in some cases, core multipliers. These variables are applied independent of the SRI factors and will all have an impact on the resultant portfolio.

The processor 12 and computer 14 may be any general-purpose computer, such as a personal computer (PC) that runs a Microsoft Windows® operating system or a mainframe computer running a UNIX-type operating system.

III. DETAILED DISCLOSURE

The present invention is described in the context of portfolio management services and investment companies commercially offered and managed by Dimensional Fund Advisors (DFA), Santa Monica, Calif. In the example below, the process is used to run the U.S. Sustainability Core 1 Portfolio and the International Sustainability Core 1 Portfolio. However, the scope of the present invention is not limited to this particular implementation of the invention. In the example below, core multipliers are different for sustainable vs. non-sustainable funds.

One preferred method of developing a U.S. Core portfolio is as follows:

Step 1: Start with a universe of securities.

Step 2: For each security, identify where the security fits in terms of size and value in the 5×5 multiplier grid below, e.g., largest, growthiest name would fall under row 1 and column 2. This security has a core multiplier of 0.45. For the smallest, deepest value name, the security falls under row 5, column 4, receiving a multiplier of 6.

|   | Neg | Low | 2 | 3 | High | ND/Util |
|---|---|---|---|---|---|---|
| 1 | 0.525 | 0.45 | 0.68 | 1.6 | 2 | 0.525 |
| 2 | 1 | 1 | 1.4 | 3 | 3.6 | 1 |
| 3 | 2.5 | 2 | 3.4 | 5.6 | 6 | 2.5 |
| 4 | 4 | 3 | 5.2 | 6 | 6 | 4 |
| 5 | 4.5 | 3 | 6 | 6 | 6 | 4.5 |

ND = no data
Util = utilities

Step 3: For each security, take the market cap (MCAP) of that security and multiply by the free-float factor for the security, and then multiply by the core multiplier determined in step 2 above.

Step 4: If there are no country weight caps (discussed below), the last step is to weight each security based on the products determined in step 3. For example, the weight of each security is determined as follows:

(security's MCAP×free-float×core multiplier)/sum of all products for all securities In comparison, for a U.S. Sustainability Core, steps 1 and 2 of the Core portfolio are also performed, but the remaining steps differ as follows:

Step 3 (which can be done before step 2) involves ranking securities within their industry by their sustainability scores, and then assigning a sustainability multiplier to each security using cumulative market cap. A neutral multiplier of 1.125 is used for securities without sustainability scores.

Step 4: Multiply for each security, MCAP×free-float×core multiplier×sustainability multiplier.

Step 5: Weight each individual security by its 'product' from step 4, relative to the sum of products in step 4.

There are other screens that can be applied, such as momentum filters, in addition to the tilting algorithm. The core multiplier grid for the sustainability core may be the same or different than the core multiplier grid for the non-sustainability core. DFA uses different multiplier grids for these two cores. Also, although the example above uses core multipliers, the weighting could be as simple as just (MCAP× free-float), or even MCAP or equal weighting (prior to sustainability multipliers). Also, a different core multiplier grid is preferably used for the International core.

Appendix A below shows selected pages of the Prospectus for the U.S. Sustainability Core 1 Portfolio and the International Sustainability Core 1 Portfolio. Appendix B shows summary pages and top holdings for such portfolios and similar summary pages and top holdings for the corresponding DFA non-sustainability weighted portfolios.

FIGS. 3A-3E, taken together, show a spreadsheet of how a sample portfolio of securities is tilted towards sustainability-friendly companies in accordance with one preferred embodiment of the present invention. The spreadsheet only shows the first 245 companies by market cap from a full listing of 2876 companies. Companies are ranked, within their industries, by their SRI score. Then, the companies are assigned an SRI multiplier, depending on where they fall in the ranking. This multiplier can be zero (i.e., don't buy at all) or higher. Here, the SRI scores range from 0.36 to 2.46, and the SRI multiplier ranges from 0.0 to 1.8. The addition of all of the weightings in the scaled "core" weight column and the scaled sustainable weight columns for the full listing of 2876 companies are both each equal to 100%. The formulas for calculating the scaled "core" weight and the scaled "sustainable" weight are shown on FIG. 3A.

In cases where sustainable multipliers are based on ranges of cumulative market cap, certain companies will "cross over" the cumulative market cap for a break. Consider an example wherein the bottom 10% of companies, by market cap, are excluded. Most likely, there is some company that straddles the 10% threshold. In those cases, the SRI multiplier is determined by interpolation, so that the percentage of the company that falls within the residual bottom 10% gets a 0 weighting and the remainder of the company gets multiplied by the next sustainable multiplier. In some cases, the SRI score is "unavailable." In these cases, a standard (usually neutral) weighting is assigned so that the security is not penalized or rewarded. Here, the neutral weighting is 1.125, which was determined by calculating how everything else worked out since the target percentages are determined by relative weighting.

Figure 4A:
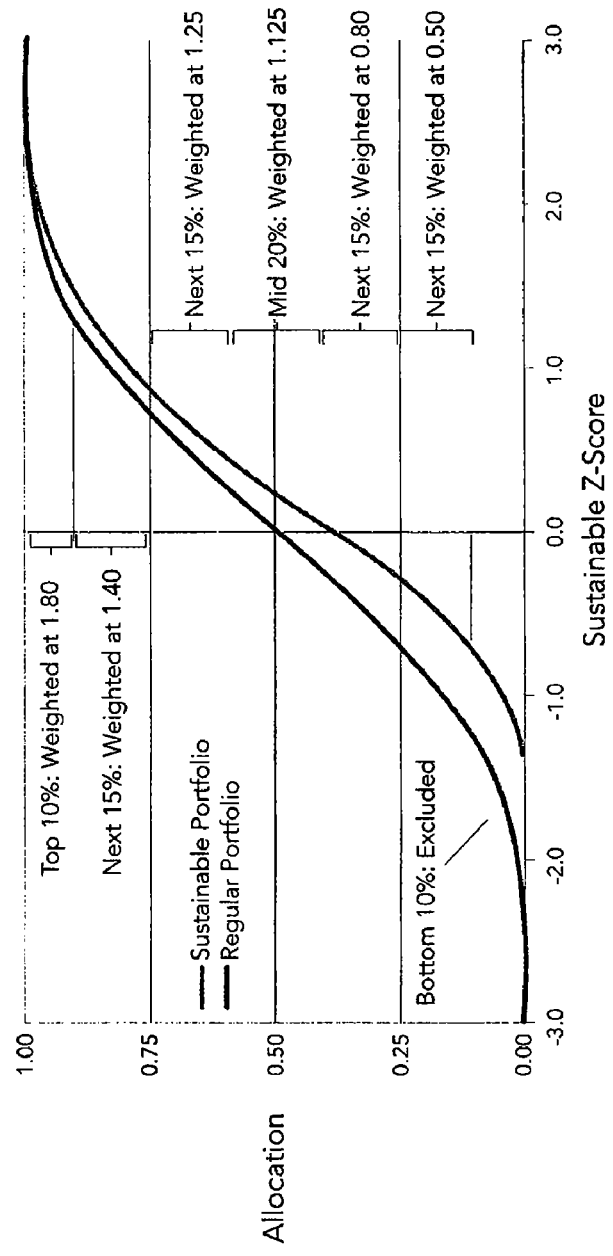
FIG. 4A shows a graph of allocation vs. sustainable Z-score for providing a sustainability overlay in accordance with a preferred embodiment of the present invention.

FIG. 4A shows one suitable graph of allocation vs. sustainable Z-score for providing a sustainability overlay.

FIGS. 4B-4H show comparisons between portfolios with sustainability overlays vs. portfolios without such overlays and industry sector allocations.

FIG. 5A shows EEP scores at a particular point in time for a sample of U.S. securities having the 32 largest market capitalization. Each security receives an overall score from 0-3 based on a weighting of three subscores (not shown). The meaning of two of the subscores (environmental vulnerability and environmental strength) is shown in FIG. 5B. The overall scores can then be used to create a relative ranking. In FIG. 5A, a relative ranking by quintiles 1-5 is shown in the last column. Other relative rankings are within the scope of the present invention. For example, the relative ranking in the example discussed above with respect to FIGS. 1 and 2 is: bottom 10%, next 15%, next 15%, next 20%, next 15%, next 15%, and top 10%.

The systems and processes described above incorporate a scientifically-based sustainability scoring system into the portfolio selection process and allow for the operation of portfolios (e.g., mutual funds) that select securities based at least in part on such a scoring system. The scoring system recognizes the effect of actions and decisions made by companies in all industries, thereby providing a "shared responsibility" view. In the preferred embodiment described above, companies with the worst scores in their industry are excluded, companies with low scores in their industry are under-weighted, and companies with the best scores in their industry are overweighted. Also, the continuous nature of the ranking system provides a better job of targeting SRI issues than a binary (i.e., one-time non-weighted include/exclude) approach and also enhances diversification.

The recommended investment portfolio created by the processes described above may be used to define an index, in the same manner that a portfolio of securities and their weightings define the S&P Index or the Russell 1000 index. That is, the index consists of the securities in the recommended investment portfolio.

The examples provided above use an EIS score as the SRI score. However, as discussed above, SRI scores may also be specific to social issues or corporate governance, or combinations thereof, and processes that use such scores are within the scope of the present invention.

In another embodiment of the present invention, factors other than social issues, corporate governance or the environment that are of interest to investors may use the above-described process by replacing the SRI scores in the database 24 with "investment factor scores" created for the particular factor(s) of interest to the investors. The remaining steps of the process are identical to those described above.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of selecting a recommended investment portfolio based in part on socially responsible considerations, the method comprising:
   (a) providing a portfolio of securities identified for potential inclusion in the recommended investment portfolio;
   (b) providing socially responsible investing (SRI) scores for the identified securities;
   (c) ranking the identified securities relative to each other based on their SRI scores in a computerized ranking engine;
   (d) entering into a processor:
      (i) initial weightings for each of the identified securities, or data by which initial weightings for each of the identified securities is objectively calculated, the initial weightings or the data being unadjusted by socially responsible considerations,
      (ii) the ranking of the identified securities based on their SRI scores, and
      (iii) an SRI multiplier algorithm that is correlated with the relative ranking;
   (e) calculating via the processor using a weighting engine, adjusted weightings for the portfolio of securities using at least the entered items (i)-(iii), wherein securities having higher ranked SRI scores relative to other securities receive greater weightings, and the weightings include non-binary weightings; and
   (f) outputting via the processor, the adjusted weightings for the portfolio of securities; and
   (g) selecting the recommended investment portfolio based in part on socially responsible considerations using the adjusted weightings.

2. The method of claim 1 wherein the adjusted weightings exclude, underweight, and overweight securities based on the relative rankings.

3. The method of claim 2 wherein the adjusted weightings excludes a predefined bottom percentage of relatively ranked securities from the recommended investment portfolio, underweight a predefined low to mid-ranked percentage of relatively ranked securities from the recommended investment portfolio, and overweight a predefined mid to high-ranked percentage of relatively ranked securities from the recommended investment portfolio.

4. The method of claim 1 wherein the SRI scores are environmental impact scores.

5. The method of claim 1 further comprising:
   (h) defining an index based on the recommended investment portfolio, the index consisting of the securities in the recommended investment portfolio.

6. The method of claim 1 wherein each of the securities are defined by an industry sector, and the ranking and calculating of adjusted weightings is performed on an industry sector basis.

7. The method of claim 1 wherein step (c) further comprises the computerized ranking engine receiving the SRI scores from a database of such scores.

8. The method of claim 1 further comprising:
   (h) periodically repeating steps (a)-(g) with updated SRI scores to generate a current recommended investment portfolio; and
   (i) comparing via the processor, the current recommended investment portfolio with an existing investment portfolio and generating a buy/sell portfolio target list to bring the existing investment portfolio in line with the current recommended investment portfolio.

9. A computer-implemented method of administering an investment company that includes a recommended investment portfolio that is selected based in part on socially responsible considerations, the method comprising:
(a) selecting the recommended investment portfolio by:
  (i) providing a portfolio of securities identified for potential inclusion in the recommended investment portfolio;
  (ii) providing socially responsible investing (SRI) scores for the identified securities;
  (iii) ranking the identified securities relative to each other based on their SRI scores in a computerized ranking engine;
  (iv) entering into a processor:
    (A) initial weightings for each of the identified securities, or data by which initial weightings for each of the identified securities can be objectively calculated, the initial weightings or the data being unadjusted by socially responsible considerations,
    (B) the ranking of the identified securities based on their SRI scores, and
    (C) an SRI multiplier algorithm that is correlated with the relative ranking;
  (v) calculating via the processor using a weighting engine, adjusted weightings for the portfolio of securities using at least the entered items (A)-(C), wherein securities having higher ranked SRI scores relative to other securities receive greater weightings, and the weightings include non-binary weightings; and
  (vi) outputting via the processor, the adjusted weightings for the portfolio of securities;
  (vii) selecting the recommended investment portfolio based in part on socially responsible considerations using the adjusted weightings; and
(b) providing an investment company portfolio trading and managing computer that receives instructions to select and hold the portfolio of securities of the selected recommended investment portfolio.

10. The method of claim 9 wherein the adjusted weightings exclude, underweight, and overweight securities based on the relative rankings.

11. The method of claim 10 wherein the adjusted weightings excludes a predefined bottom percentage of relatively ranked securities from the recommended investment portfolio, underweight a predefined low to mid-ranked percentage of relatively ranked securities from the recommended investment portfolio, and overweight a predefined mid to high-ranked percentage of relatively ranked securities from the recommended investment portfolio.

12. The method of claim 9 wherein the SRI scores are environmental impact scores.

13. The method of claim 9 further comprising:
  (c) defining an index based on the recommended investment portfolio.

14. The method of claim 9 wherein each of the securities are defined by an industry sector, and the ranking and calculating of adjusted weightings is performed on an industry sector basis.

15. The method of claim 9 wherein step (a)(iii) further comprises the computerized ranking engine receiving the SRI scores from a database of such scores.

16. The method of claim 9 wherein step (a) further comprises:
  (viii) periodically repeating steps (i)-(vii) with updated SRI scores to generate a current recommended investment portfolio; and step (b) further comprises the investment company portfolio trading and managing computer:
  (i) comparing the current recommended investment portfolio with an existing investment portfolio and generating a buy/sell portfolio target list to bring the existing investment portfolio in line with the current recommended investment portfolio, and
  (ii) executing buy/sell instructions to bring the existing investment portfolio in line with the current recommended investment portfolio.

17. An apparatus for selecting a recommended investment portfolio based in part on socially responsible considerations, the apparatus comprising:
(a) a securities database that stores and outputs a portfolio of securities identified for potential inclusion in the recommended investment portfolio;
(b) a score database that provides socially responsible investing (SRI) scores for the identified securities;
(c) a computerized ranking engine that ranks the identified securities relative to each other based on their SRI scores; and
(d) a processor having a weighting calculation engine, the processor configured to:
  (i) receive
    (A) initial weightings for each of the identified securities, or data by which initial weightings for each of the identified securities is objectively calculated, the initial weightings or the data being unadjusted by socially responsible considerations,
    (B) the ranking of the identified securities based on their SRI scores from the computerized ranking engine, and
    (C) an SRI multiplier algorithm that is correlated with the relative ranking;
  (ii) calculate in the weighting calculation engine adjusted weightings for the portfolio of securities using at least the entered items (i)(A)-(C), wherein securities having higher ranked SRI scores relative to other securities receive greater weightings, and the weightings include non-binary weightings; and
  (iii) output the adjusted weightings for the portfolio of securities; and
  (iv) select the recommended investment portfolio based in part on socially responsible considerations using the adjusted weightings.

18. The apparatus of claim 17 wherein the adjusted weightings exclude, underweight, and overweight securities based on the relative rankings.

19. The apparatus of claim 17 wherein each of the securities are defined by an industry sector, and the ranking and calculating of adjusted weightings is performed on an industry sector basis.

20. The apparatus of claim 17 wherein the selection of a recommended investment portfolio is periodically repeated with updated investment factor scores to generate a current recommended investment portfolio, the processor further configured to:
  (v) compare the current recommended investment portfolio with an existing investment portfolio and generate a buy/sell portfolio target list to bring the existing investment portfolio in line with the current recommended investment portfolio.

* * * * *

UNITED STATES PATENT AND TRADEMARK OFFICE
CERTIFICATE OF CORRECTION

| | | |
|---|---|---|
| PATENT NO. | : 7,596,525 B1 | |
| APPLICATION NO. | : 12/422667 | |
| DATED | : September 29, 2009 | |
| INVENTOR(S) | : Eduardo Repetto | |

It is certified that error appears in the above-identified patent and that said Letters Patent is hereby corrected as shown below:

Column 8, line 1:

Before the claims, insert Appendix A and B (pages 12-90) as attached.

Signed and Sealed this
Seventh Day of February, 2012

David J. Kappos
*Director of the United States Patent and Trademark Office*

Appendix A.

PROSPECTUS

March 29, 2008

Please carefully read the important information it contains before investing.

DFA Investment Dimensions Group Inc.

DFA Investment Dimensions Group Inc. is an investment company that offers a variety of investment portfolios. Each Portfolio described in this Prospectus:

- Is generally available only to institutional investors and clients of registered investment advisors.
- Has its own investment Objective and policies, and is the equivalent of a separate mutual fund.
- Does not charge a sales commission or "load."
- Is designed for long-term investors.

U.S. Sustainability Core 1 Portfolio

International Sustainability Core 1 Portfolio

The Securities and Exchange Commission has not approved or disapproved these securities or passed upon the adequacy of this Prospectus. Any representation to the contrary is a criminal offense.

TABLE OF CONTENTS

RISK/RETURN SUMMARY

About the Portfolios

Management

Equity Investment Approach

Investment Objectives, Strategies, and Risks

Principal Risks

Other Risks

Other Information

Risk and Return Bar Chart and Table

FEES AND EXPENSES

ANNUAL FUND OPERATING EXPENSES

EXAMPLE

HIGHLIGHTS

Management Services

Purchase, Valuation, and Redemption of Shares

INVESTMENT OBJECTIVES AND POLICIES

APPLYING THE PORTFOLIOS' ENVIRONMENTAL IMPACT CONSIDERATIONS

PORTFOLIO TRANSACTIONS

SECURITIES LOANS

MANAGEMENT OF THE PORTFOLIOS

Investment Services—International Portfolio

DIVIDENDS, CAPITAL GAINS DISTRIBUTIONS AND TAXES

ELECTRONIC SHAREHOLDER INFORMATION AND TRANSACTIONS

PURCHASE OF SHARES

Cash Purchases

In-Kind Purchases

POLICY REGARDING EXCESSIVE OR SHORT-TERM TRADING

VALUATION OF SHARES

Net Asset Value

Public Offering Price

EXCHANGE OF SHARES

REDEMPTION OF SHARES

Redemption Procedure

Redemption of Small Accounts

In-Kind Redemptions

DISCLOSURE OF PORTFOLIO HOLDINGS

DELIVERY OF SHAREHOLDER DOCUMENTS

SERVICE PROVIDERS

RISK/RETURN SUMMARY

About the Portfolios

The Portfolios:

Are generally offered to institutional investors and clients of registered investment advisors.

Do not charge sales commissions or "loads."

Are designed for long-term investors.

Management

Dimensional Fund Advisors LP (the "Advisor") is the investment manager for the Portfolios.

Equity Investment Approach

The Advisor believes that equity investing should involve a long-term view and a focus on asset class (e.g., U.S. securities) selection, not stock picking. It places priority on controlling expenses, portfolio turnover, and trading costs. Many other investment managers concentrate on reacting to price movements and choosing individual securities.

*Portfolio construction:* Generally, the Advisor structures a Portfolio by:

1. Selecting a starting universe of securities (for example, all publicly traded U.S. common stocks).

2. Creating a subset of companies meeting the Advisor's investment guidelines.

3. Excluding the securities of certain companies and emphasizing the exposure to others after analyzing various factors (for example, book-to-market ratio, size or liquidity)

4. Purchasing securities so the Portfolio is generally diversified within its targeted asset class, while adjusting the composition of the Portfolio based on environmental impact considerations. Relative to a portfolio without environmental impact considerations, the Portfolio will exclude or underweight securities of companies that, according to the Portfolio's environmental impact considerations, may have a relatively negative impact on the environment as compared either to other companies in the Portfolio's entire investment universe or other companies with similar business lines. Similarly, relative to a portfolio without environmental impact considerations, the Portfolio will overweight securities of companies that, according to the Portfolio's environmental impact considerations, may have a relatively positive impact on the environment as compared either to other companies in the Portfolio's entire investment universe or other companies with similar business lines.

See "APPLYING THE PORTFOLIOS' ENVIRONMENTAL IMPACT CONSIDERATIONS" for a description of the environmental impact considerations utilized by the Portfolios.

Investment Objectives, Strategies, and Risks

*U.S. Sustainability Core I Portfolio*

- *Investment Objective*: Long-term capital appreciation.

- *Investment Strategy*: Purchase a broad portfolio of securities of U.S. operating companies with an increased exposure to small capitalization and value companies, while adjusting the composition of the Portfolio based on environmental impact considerations. Relative to a portfolio without environmental impact considerations, the Portfolio will exclude or underweight securities of companies that, according to the Portfolio's environmental impact considerations, may have a relatively negative impact on the environment as compared either to other companies in the Portfolio's entire investment universe or other companies with similar business lines. Similarly, relative to a portfolio without environmental impact considerations, the Portfolio will overweight securities of companies that, according to the Portfolio's environmental impact considerations, may have a relatively positive impact on the environment as compared either to other companies in the Portfolio's entire investment universe or other companies with similar business lines.

- *Principal Risks*: Market Risk, Small Company Risk and Environmental Consideration Investment Risk.

*International Sustainability Core 1 Portfolio*

- *Investment Objective*: Long-term capital appreciation.

- *Investment Strategy*: Purchase a broad portfolio of securities of non-U.S. companies with an increased exposure, to small capitalization and value companies, while adjusting the composition of the Portfolio based on environmental impact considerations. Relative to a portfolio without environmental impact considerations, the Portfolio will exclude or underweight securities of companies that, according to the Portfolio's environmental impact considerations, may have a relatively negative impact on the environment as compared either to other companies in the Portfolio's entire investment universe or other companies with similar business lines. Similarly, relative to a portfolio without environ mental impact considerations, the Portfolio will overweight securities of companies that, according to the Portfolio's environmental impact considerations, may have a relatively positive impact on the environment as compared either to other companies in the Portfolio's entire investment, universe or other companies with similar business lines.

- *Principal Risks*: Market Risk, Small Company Risk, Foreign Securities and Currencies Risk and Environmental Consideration Investment Risk.

Principal Risks

Market Risk (Both Portfolios): Even a long-term investment approach cannot guarantee a profit. Economic, political, and issuer-specific events will cause the value of securities, and the Portfolio that owns them, to rise or fall. Because the value of your investment in the Portfolio will fluctuate, there is the risk that you may lose money.

*Small Company Risk (Both Portfolios):* Securities of small companies are often less liquid than those of large companies. As a result, small company stocks may fluctuate relatively more in price.

*Foreign Securities and Currencies Risk (International Sustainability Core I Portfolio):* Foreign securities prices may decline or fluctuate because of (a) economic or political actions of foreign governments, and/or (b) less regulated or liquid securities markets. Investors holding these securities also are exposed to foreign currency risk (the possibility that foreign currency will fluctuate in value against the U.S. dollar).

*Environmental Impact Consideration Investment Risk (Both Portfolios):* A Portfolio's environmental impact considerations may limit the number of investment opportunities available to the Portfolio, and as a result, at times, the Portfolio may produce more modest gains than funds that are not subject to such special investment considerations. For example, a Portfolio may decline to purchase, or underweight its investment in, certain securities due to environmental impact considerations when other investment considerations would suggest that a more significant investment in such securities would be advantageous. In addition, a Portfolio may sell certain securities due to environmental impact considerations when it is otherwise disadvantageous to do so. The environmental impact considerations may cause the Portfolio's industry allocation to deviate from that of funds without these considerations and of conventional benchmarks.

Other Risks

Derivatives:

Derivatives are securities, such as futures contracts, whose value is derived from that of other securities or indices. Each Portfolio may use derivatives, such as futures contracts and options on futures contracts, to gain market exposure on the Portfolio's uninvested cash pending investment in securities or to maintain liquidity to pay redemptions. Gains or losses from derivative investments may be substantially greater than the derivatives' original cost.

Securities Lending:

Each Portfolio may lend its portfolio securities to generate additional income. Securities lending involves the risk that the borrower may fail to return the securities in a timely manner or at all. As a result, a Portfolio may lose money and there may be a delay in recovering the loaned securities. A Portfolio also could lose money if it does not recover the securities and/or the value of the collateral falls, including the value of investments made with cash collateral. Securities lending may have certain potential adverse tax consequences. See "SECURITIES LOANS" for further information on securities lending.

Other Information

*Commodity Pool Operator Exemption*: Each Portfolio is operated by a person that has claimed an exclusion from the definition of the term "commodity pool operator" under the Commodity Exchange Act ("CEA"), and, therefore, such person is not subject to registration or regulation as a pool operator under the CEA.

Risk and Return Bar Chart and Table

Performance information is not available for the Portfolios because they have less than, one calendar year of performance.

FEES AND EXPENSES

This table describes the fees and expenses you may pay if you buy and hold shares of the Portfolios.

Shareholder Fees (fees paid directly from your investment): None

ANNUAL FUND OPERATING EXPENSES

(expenses that are deducted from Portfolio assets)

U.S. SUSTAINABILITY CORE 1 PORTFOLIO

| | |
|---|---|
| Management Fee | 0.29% |
| Other Expenses | 0.09%* |
| Acquired Fund Fees & Expenses | N/A |
| Total Annual Operating Expenses | 0.38% |
| Fee Waiver and/or Expense Reimbursements | (0.01)% |
| Net Expenses. | 0.37%** |

INTERNATIONAL SUSTAINABILITY CORE 1 PORTFOLIO

| | |
|---|---|
| Management Fee | 0.42% |
| Other Expenses | 0.15%* |
| Acquired Fund Fees & Expenses | N/A |
| Total Annual Operating Expenses | 0.57% |
| Fee Waiver and/or Expense Reimbursements. | 0.00% |
| Net Expenses | 0.57%** |

\* "Other Expenses" are annualized expenses based on anticipated fees and. expenses payable by the Portfolio through the fiscal year ending November 30, 2008.

\*\*Pursuant to a Fee Waiver and Expense Assumption Agreement for each Portfolio, the Advisor has agreed to waive all or a portion of its management fee and to assume the ordinary operating expenses of the Portfolio (excluding the expenses that the Portfolio incurs indirectly through its investment in other investment companies) ("Portfolio Expenses") to the extent necessary to limit the Portfolio Expenses of the U.S. Sustainability Core 1 Portfolio and International Sustainability Core 1 Portfolio to 0.37% and 0.57%, respectively, of each Portfolio's average net assets on an annualized basis (the "Expense Limitation Amount"). At any time that the Portfolio Expenses of a Portfolio are less than the Portfolio's Expense Limitation Amount, the Advisor retains the right to seek reimbursement for any fees previously waived and/ or expenses previously assumed to the extent that such reimbursement will not cause the Portfolio's annualized Portfolio Expenses to exceed the Portfolio's Expense Limitation Amount. A Portfolio is not obligated to reimburse the Advisor for fees previously waived or expenses previously assumed by the Advisor more than thirty-six months before the date of such reimbursement. The Fee Waiver and Expense Assumption Agreement will remain in effect for an initial period until April 1, 2009, and then shall continue in effect from year to year for one-year periods thereafter unless terminated by the Fund or the Advisor.

EXAMPLE

This Example is meant to help you compare the cost of investing in the Portfolios with the cost of investing in other mutual funds.

The Example assumes that you invest $10,000 in the Portfolio for the time periods indicated and then redeem all of your shares at the end of those periods. The Example also assumes that your investment, has a 5% return each year and that the Portfolio's operating expenses remain the same. Although your actual costs may be higher or lower, based on these assumptions, your costs would be as follows:

|  | 1 Year | 3 Years |
|---|---|---|
| U.S. Sustainability Core Portfolio[1] | $38 | $121 |
| International Sustainability Core 1 Portfolio | $58 | $183 |

(1) The costs for the Portfolio reflect the "Net Expenses" of the Portfolio that result from the contractual expense waiver and assumption in the first year only.

Because the Portfolios are new, the Example for each Portfolio is based on the anticipated expenses for the Portfolio for the current fiscal year, and does not extend over five- and ten-year periods.

HIGHLIGHTS

Management Services

The Advisor serves as investment advisor to the Portfolios. See "MANAGEMENT OF THE PORTFOLIOS."

Purchase, Valuation, and Redemption of Shares

The shares of each Portfolio are sold at net asset value. The redemption price of the shares of each Portfolio is also equal to the net asset value of its shares. The value of a Portfolio's shares will fluctuate in relation to its own investment experience. See "PURCHASE OF SHARES," "VALUATION OF SHARES," and "REDEMPTION OF SHARES."

Electronic Shareholder Information

In order to conserve natural resources, an investor, when opening an account, is expected to consent to the acceptance of all shareholder information about the Portfolios through electronic delivery and access to the Portfolios' website at www.dimensionai.conL See "ELECTRONIC SHAREHOLDER INFORMATION AND TRANSACTIONS."

INVESTMENT OBJECTIVES AND POLICIES
U.S. SUSTAINABILITY CORE 1 PORTFOLIO

The investment objective of the U.S. Sustainability Core 1 Portfolio (the "U.S. Portfolio") is to achieve long-term capital appreciation. The U.S. Portfolio seeks to achieve its investment objective by purchasing a broad and diverse group of common stocks of U.S. companies with an increased exposure to small capitalization and value companies relative to the U.S. Universe, while, relative to a portfolio without the environmental impact considerations, excluding or underweighting securities of companies that, according to the Portfolio's environmental impact considerations, may have a relatively negative impact on the environment and overweighting securities of companies that may have a relatively positive impact on the environment. (See "APPLYING THE PORTFOLIOS' ENVIRONMENTAL IMPACT CONSIDERATIONS") The Advisor defines the "U.S. Universe" as a market capitalization weighted portfolio of U.S. operating companies listed on the New York Stock Exchange ("NYSE"), American Stock Exchange ("Amex") and NASDAQ Global Market ("NASDAQ").

The increased exposure to small and value companies may be achieved by decreasing the allocation of the U.S. Portfolio's assets to the largest U.S. growth companies relative to their weight in the U.S. Universe, which would result in a greater weight allocation to small capitalization and value companies. As of the date of this Prospectus, the Advisor considers small capitalization companies to be companies whose market capitalizations are in the lowest 10% of total market capitalization or companies whose market capitalizations are smaller than the 1000th largest U.S. company, whichever results in the higher market capitalization break. Under the Advisor's market capitalization guidelines described above, as of December 31, 2007, the market capitalization of a small cap company was defined by the 10% market capitalization guideline to be $2,464 million, or below. This dollar amount will change due to market conditions. An equity issuer is considered a growth company primarily because it has a low, non-negative book value in relation to its market capitalization. An equity issuer is considered a value company primarily because it has a high book value in relation to its market capitalization. In assessing growth and value, the Advisor may consider additional factors, such as price-to-cash-flow or price-to-earnings ratios, as well as economic conditions and developments in the issuer's industry.

The percentage allocation of the assets of the U.S. Portfolio to securities of the largest U.S. growth companies, as defined above, will generally be reduced from between 2.3% and 25% of their percentage weight in the U.S. Universe. For example, as of December 31, 2007, securities of the largest U.S. growth companies comprised 32% of the U.S. Universe, and if the U.S. Portfolio had been in operation, the Advisor would have allocated 22% of the U.S. Portfolio's assets to securities of the largest U.S. growth companies. The percentage by which the U.S. Portfolio's allocation to securities of the largest U.S. growth companies is reduced will fluctuate with market movements. Additionally, the range by which the U.S. Portfolio's percentage allocation to the securities of the largest U.S. growth companies is reduced as compared to the U.S. Universe will change from time to time and may be impacted by the Portfolio's investment strategies with respect to environmental impact considerations.

As a non-fundamental policy, under normal circumstances, the U.S. Portfolio will invest at least 80% of its net assets in securities of U.S. companies. If the U.S. Portfolio changes this investment policy, the U.S. Portfolio will notify shareholders at least 60 days before the change, and will change the name of the Portfolio.

The U.S. Portfolio also may invest in exchange-traded funds (ETFs) and similarly structured pooled investments for the purpose of gaining exposure to the U.S. stock market while maintaining liquidity. The U.S. Portfolio also may use derivatives, such as futures contracts and options on futures contracts, to gain market exposure on uninvested cash pending investment in securities or to maintain liquidity to pay redemptions. The U.S. Portfolio may enter into futures contracts and options on futures contracts for U.S. equity securities and indices. In addition to money market instruments and short-term investments, the U.S. Portfolio may invest in affiliated and unaffiliated registered and unregistered money market funds to manage the Portfolio's cash pending investment in other securities or to maintain liquidity for the payment of redemptions or other purposes. Investments in money market funds may involve a duplication of certain fees and expenses. The above-referenced investments are not subject to, although they may incorporate, the U.S. Portfolio's environmental impact considerations.

INTERNATIONAL SUSTAINABILITY CORE 1 PORTFOLIO

The investment objective of the International Sustainability Core 1 Portfolio (the "International Portfolio") is to achieve long-term capital appreciation. The International Portfolio seeks to achieve its investment objective by purchasing a broad and diverse group of stocks of non-U.S. companies with an increased exposure to small capitalization and value companies relative to .the International Universe, while, relative to a portfolio without environmental impact considerations, excluding or underweighting securities of companies that, according to the Portfolio's environmental impact considerations, may have a relatively negative impact on the environment and overweighting securities of companies that may have a relatively positive impact on the environment. (See "APPLYINGTHE PORTFOLIOS' ENVIRONMENTAL IMPACT CONSIDERATIONS.") For purposes of this Portfolio, the Advisor defines the "International Universe" as a market capitalization weighted portfolio of non-U.S. companies in developed markets that have been authorized for investment by the Advisor's Investment Committee, As of the date of this Prospectus, the following markets have been authorized for investment for the Portfolio and comprise the International Universe: Australia, Austria, Belgium, Canada, Denmark, Finland, France, Germany, Greece, Hong Kong, Ireland, Italy, Japan, the Netherlands, New Zealand, Norway, Portugal, Singapore, Spain, Sweden, Switzerland and the United Kingdom (collectively, the "Approved Markets"). The Advisor will determine in its discretion when and whether to invest in markets that have been authorized, depending on a number of factors, such as asset growth in the Portfolio and characteristics of each such market. The Investment Committee of the Advisor also may authorize other markets for investment in the future, in addition to the Approved Markets identified, above, or may remove one or more markets from the list of Approved Markets. Also, the Portfolio may continue to hold investments in countries that are not currently designated as Approved Markets, but had been authorized for investment in the past, and may reinvest distributions received in connection with such existing investments in such previously Approved Markets.

The increased exposure to small capitalization and value companies for the International Portfolio may be achieved by decreasing the allocation of the Portfolio's assets to the largest growth companies relative to their weight in the International Universe, which would result in a greater weight allocation to small capitalization and value companies. As of December 31, 2007, on an aggregate basis for the Portfolio, the Advisor considered small capitalization companies to be those companies with a market capitalization below $4,115 million. This threshold will vary by country or region. An equity issuer is considered a growth company primarily because it has a low, non-negative book value in relation to its market capitalization. An equity issuer is considered a value company primarily because it has a high book value in relation to its market capitalization. In assessing growth and value, the Advisor may consider additional factors, such as price-to-cash-flow or price-to-earnings ratios, as well as economic conditions and developments in the issuer's industry.

The Advisor determines company size on a country- or region-specific basis and based primarily on market capitalization. The percentage allocation of the assets of the International Portfolio to securities of the largest growth companies as defined above will generally be reduced from between 5% and 35% of their percentage weight in the International Universe. For example, as of December 31, 2007, securities of the largest growth companies in the International Universe comprised. 16% of the International Universe, and if the International Portfolio had been in operation, the Advisor would have allocated 8% of the International Portfolio's assets to securities of the largest growth companies in the International Universe. The percentage by which the International Portfolio's allocation to securities of the largest growth companies is reduced will fluctuate with market movements. Additionally, the range by which the International Portfolio's percentage allocation to the securities of the largest growth companies is reduced as compared to the International Universe will change from time to time and may be impacted by the Portfolio's investment strategies with respect to environmental impact considerations.

The International Portfolio may invest in Exchange Traded Funds (ETFs) and similarly structured pooled investments for the purpose of gaining exposure to the equity markets, including the U.S. equity market, while maintaining liquidity. The International Portfolio also may use derivatives, such as futures contracts and options on. futures contracts, to gain market exposure on uninvested cash pending investment in securities or to maintain liquidity to pay redemptions. The International Portfolio may enter into futures contracts and options on futures contracts for equity securities and indices, including U.S. issuers and indices. In addition to money market, instruments and other short-term investments, the Portfolio may invest in affiliated and. unaffiliated registered and unregistered money market funds to manage the Portfolio's cash pending investment in other securities or to maintain liquidity for the payment of redemptions or other purposes. Investments in money market funds may involve a duplication of certain fees and expenses. The above-referenced investments are not subject to, although they may incorporate, the International Portfolio's environmental impact considerations.

The International Portfolio invests in securities of Approved Markets (as identified above) listed on bona fide securities exchanges or traded on the over-the-counter markets. These exchanges or over-the-counter markets may be either within or outside the issuer's domicile country. For example, the securities may be listed or traded in the form of European Depositary Receipts, Global Depositary Receipts, American Depositary Receipts, or other types of depositary receipts (including non-voting depositary receipts) or may be listed on bona fide securities exchanges in more than one country. The International Portfolio will consider for purchase securities that are associated with an Approved Market, and include, among others: (a) securities of companies that are organized under the laws of, or maintain their principal place of business in, an Approved Market; (b) securities for which the principal trading market is in an Approved Market; (c) securities issued or guaranteed by the government of an Approved Market, its agencies or instrumentalities, or the central bank of such country or territory: (d) securities denominated in an Approved Market currency issued by companies to finance operations in Approved Markets: (e) securities of companies that derive at least 50% of their revenues or profits from goods produced or sold, investments made, or services performed in Approved Markets or have at least 50% of their assets in Approved Markets; (f) equity securities of companies in Approved Markets in the form of depositary shares; (g) securities of pooled investment, vehicles that invest primarily in securities of Approved Markets or derivative instruments that derive their value from securities of Approved Markets; or (h) securities included in the Portfolio's benchmark index. Securities of Approved Markets may include securities of companies that have characteristics and business relationships common to companies in other countries or regions. As a result, the value of the securities of such companies may reflect economic and market forces in such other countries or regions as well as in the Approved Markets. The Advisor, however, will select only those companies that, in its view, have sufficiently strong exposure to economic and market forces in Approved Markets. For example, the Advisor may invest in companies organized and located in the United States or other countries or regions outside of Approved Markets, including companies having their entire production facilities outside of Approved Markets, when such companies meet the criteria discussed above to be considered associated with Approved Markets.

APPLYING THE PORTFOLIOS' ENVIRONMENTAL IMPACT CONSIDERATIONS

The Advisor intends to take into account the impact that companies have on the environment when making investment decisions for a Portfolio by adjusting the composition of the Portfolio based on environmental impact considerations. Relative to a portfolio without environmental impact considerations, a Portfolio will exclude or underweight securities of companies that, according to the Portfolio's environmental impact considerations, may have a relatively negative impact on the environment as compared either to other companies in the Portfolio's entire investment universe or other companies with similar business lines. Similarly, relative to a portfolio without environmental impact considerations, a Portfolio will overweight securities of companies that, according to the Portfolio's environmental impact considerations, may have a relatively positive impact on the environment as compared either to other companies in the Portfolio's entire investment universe or other companies with similar business lines. The Advisor is expected to engage one or more third party service providers to provide research and ratings information relating to the Portfolio's environmental impact considerations with respect to securities in the portfolios, where information is available from such providers.

Examples of the types of considerations that are expected to be used to evaluate companies' impact on the environment are as follows:

Negative Factors:

- Agricultural chemicals: The company produces substantial amounts of agricultural chemicals, including pesticides.

- Climate change: A substantial percentage of the company's revenues relate, directly or indirectly, to the sale of coal or oil and their derivative fuel products.

- Hazardous waste: The company has incurred substantial liabilities, such as significant fines or civil penalties, for hazardous waste; or waste management violations.

- Ozone depleting chemicals: The company is a manufacturer of ozone depleting chemicals such as HCFCs, methyl chloroform, methylene, chloride, or bromines.

- Regulatory problems: The company recently has incurred substantial fines or civil penalties for, or demonstrated a pattern of issues regarding, violations of air, water, or other environmental regulations.

- Substantial emissions: The company exhibits markedly high emissions of toxic chemicals into the air and water from individual plants.

- Negative economic impact: The company's actions have incited major controversies regarding the quality of life, or property values in the community.

- Other environmental concerns: The company has had material involvement in an environmental controversy not covered by other factors.

Positive Factors:

- Beneficial products and services: The company earns substantial revenues through the development of innovative products with environmental benefits, including remediation products, environmental services, or products that promote the efficient use of energy.

- Clean energy: The company has taken notable steps to reduce the impact of its operations on global climate change and air pollution through the use of renewable energy or other clean fuels, or through the introduction of energy efficient programs or sale of products promoting energy efficiency.

- Environmental management systems: The company has exhibited a strong commitment to environmental management systems through ISO 14001 certification and other voluntary programs.

- Pollution prevention: The company has established strong pollution prevention programs, including those designed to cut both emissions and toxic uses.

- Recycling: The company either uses a significant percentage of recycled materials in its manufacturing process, or is a major firm in the recycling industry.

- Other strengths: The company has undertaken noteworthy environmental initiatives not covered by other factors.

The environmental impact considerations listed above seek to identify factors that the Advisor believes indicate whether or not a company, as compared to other companies with similar business lines, promotes sustainability by pursuing economic growth and development that meets the needs of the present without compromising the needs of future generations. A Portfolio may periodically modify its environmental impact considerations.

Based on the research and ratings information provided by the third party service providers on a company with respect to both the positive and negative environmental factors, the Advisor will determine an overall environmental impact score for the company. The Advisor will use the overall environmental impact score of a company to determine whether the securities of the company should be: (i) excluded from a Portfolio's securities holdings; (ii) underweighted within the Portfolio; or (iii) overweighted within the Portfolio.

As described above, the Advisor will endeavor to consider the environmental impact of each company when constructing a Portfolio's investment portfolio. However, the Advisor may not be able to assess the environmental impact of each company eligible for purchase by a. Portfolio. For example, the Advisor may not be able to determine an overall environmental impact score for each company based on the environmental considerations described above because the third party service providers may not have data on the entire universe of companies considered by the Advisor for a Portfolio, or may not have information with respect to each factor listed above as an environmental impact consideration.

The environmental impact of a company may change while a Portfolio is holding the company's securities due to actions taken by the company or new information that becomes available concerning the company, and such information may impact the Portfolio's decision to buy shares in the future of such company but will not necessarily result in changes to current holdings of such shares. For instance, if negative information about a company becomes available, while future investment decisions should reflect that information, the Portfolio may continue to hold the securities it already owns in the short or long term, so that the composition of the Portfolio may not, at all times, reflect the most current environmental impact considerations. A Portfolio's exposure to companies, industries and sectors of the market may be affected by environmental impact data obtained that may not be completely accurate with respect to any company or by a given environmental factor that may not be as relevant as assumed in the overall score.

Because the Advisor takes into account environmental impact considerations when constructing the investment portfolio for a Portfolio, a Portfolio may not invest in, or deviate in its exposure to, certain types of companies, industries, and segments of the designated markets in which a similar Portfolio without environmental impact considerations invests.

Each Portfolio's environmental impact considerations are designed to meet the investing needs of shareholders; the exclusion, purchase, or sale of specific securities in a Portfolio should not be construed as reflecting a judgment by the Advisor or the Board of Directors of the Fund relating to any environmental issue.

PORTFOLIO TRANSACTIONS

Securities will not be purchased or sold based on the prospects for the economy, the securities markets, or the individual issuers whose shares are eligible for purchase. Securities that have depreciated in value since their acquisition will not be sold solely because prospects for the issuer are not considered attractive or due to an expected or realized decline in securities prices in general. Securities will not be sold to realize short-term profits, but when circumstances warrant, they may be sold without regard to the length of time held. Securities, including those eligible for purchase, may be disposed of, however, at any time when, in the Advisor's judgment, circumstances warrant their sale, including, but not limited to, tender offers, mergers, and similar transactions, or bids made for block purchases at opportune prices. Generally, securities will be purchased with the expectation that they will be held for longer than one year and will be held until such time as they are no longer an appropriate holding in light of the investment policies of a Portfolio.

SECURITIES LOANS

Each Portfolio is authorized to lend securities to qualified brokers, dealers, banks, and other financial institutions for the purpose of earning additional income. While a Portfolio may earn additional income from lending securities, such activity is incidental to the investment objective of the Portfolio. The value of securities loaned may not exceed 33 1/3% of the value of a Portfolio's total assets, which includes the value of collateral received. To the extent a Portfolio loans a portion of its securities, the Portfolio will receive collateral consisting generally of cash or U.S. government securities, which will be maintained by marking to market daily in an amount equal to at least: (i) 100% of the current market value of the loaned securities, with respect to securities of the U.S. government or its agencies; (ii) 102% of the current market value of the loaned securities, with respect to U.S. securities; and (iii.) 105% of the current market value of the loaned securities, with respect to foreign securities. Subject to its stated investment policies, a Portfolio may invest the collateral received for the loaned securities in securities of the U.S. government or its agencies, repurchase agreements collateralized by securities of the U.S. government or its agencies, and affiliated and unaffiliated registered and unregistered money market funds. For purposes of this paragraph, agencies include both agency debentures and agency mortgage-backed securities. In addition, a Portfolio will be able to terminate the loan at any time and will receive reasonable interest on the loan, as well as amounts equal to any dividends, interest, or other distributions on the loaned securities. However, dividend income received from loaned securities may not be eligible to be taxed at qualified dividend income rates. See the Portfolios' Statement of Additional Information (the "SAP') for a further discussion of the tax consequences related to securities lending. A Portfolio will be entitled to recall a loaned security to vote proxies or otherwise obtain rights to vote proxies of loaned securities if the Portfolio knows that a material event will occur. In the event of the bankruptcy of the borrower, the Fund could experience delay in recovering the loaned securities or only recover cash or a security of equivalent value. See "OTHER RISKS— SECURITIES LENDING" for a discussion of the risks related to securities lending.

MANAGEMENT OF THE PORTFOLIOS

The Advisor serves as investment advisor to each Portfolio. As such, the Advisor is responsible for the management of each Portfolio's assets. Each Portfolio is managed using a team approach. The investment team includes the Investment Committee of the Advisor, portfolio managers, and trading personnel.

The Investment Committee is composed primarily of certain officers and directors of the Advisor who are appointed annually. As of the date of this Prospectus, the Investment Committee has eight members. Investment strategies for each Portfolio are set by the Investment Committee, which meets on a regular basis and also as needed to consider investment issues. The Investment Committee also sets and reviews all investment related policies and procedures and approves any changes in regards to authorized countries, security types, and brokers.

In accordance with the team approach used to manage each Portfolio, the portfolio managers and portfolio traders implement the policies and procedures established by the Investment Committee. The portfolio managers and portfolio traders also make daily investment decisions regarding each Portfolio, including running buy and sell programs, based on. the parameters established by the Investment Committee. Stephen A. Clark and Robert T. Deere, the portfolio managers for the U.S. Portfolio, coordinate the efforts of all other portfolio managers with respect to the day-to-day management of that Portfolio and other domestic equity portfolios managed by the Advisor. Karen E. Umland, the portfolio manager for the International Portfolio, coordinates the efforts of all other portfolio managers with respect to the day-to-day management of that Portfolio and other international equity portfolios managed by the Advisor.

Mr. Clark is a Senior Portfolio Manager and Vice President of the Advisor and chairman of the Investment Committee. Mr. Clark received his MBA from the University of Chicago and his BS from Bradley University. Mr. Clark joined the Advisor in 2001 and has been responsible for the portfolio management group since January 2006.

Mr. Deere is a Senior Portfolio Manager and Vice President of the Advisor and a member of the Investment Committee. Mr. Deere received his MBA from the University of California at Los Angeles in 1991. He also holds a BS and BA from the University of California at San Diego. Mr. Deere joined the Advisor in 1991 and has been responsible for the domestic equity portfolios since 1994.

Ms. Umland is a Senior Portfolio Manager and Vice President of the Advisor and a member of the Investment Committee. She received her BA from Yale University in 1988 and her MBA from the University of California at Los Angeles in 1993. Ms. Umland joined the Advisor in 1993 and has been responsible for the international equity portfolios since 1998.

The Portfolios' SAI provides information about each portfolio manager's compensation, other accounts managed by each portfolio manager, and each portfolio manager's ownership of Portfolio shares.

The Advisor provides each Portfolio with a trading department and selects brokers and dealers to effect securities transactions. Securities transactions are placed with a view to obtaining best price and execution. The Advisor's address is 1299 Ocean Avenue, Santa Monica, CA 90401. A discussion regarding the basis for the Board of Directors' approving the investment management agreements with respect to the Portfolios will be available in future annual or semi-annual reports to shareholders of the Portfolios.

The Fund bears all of its own costs and expenses, including: services of its independent registered public accounting firm, legal counsel, brokerage fees, commissions, and transfer taxes in connection with the acquisition and disposition of portfolio securities, taxes, insurance premiums, costs incidental to meetings of its shareholders and directors, the cost of filing its registration statements under the federal securities laws and the cost of any filings required under state securities laws, reports to shareholders, and transfer and dividend disbursing agency, administrative services, and custodian fees. Expenses allocable to a particular portfolio of the Fund are so allocated. The expenses of the Fund that are not allocable to a particular portfolio are borne by each portfolio on the basis of its relative net assets or equally.

The Advisor has been engaged in the business of providing investment, management services since May 1981. The Advisor is currently organized as a Delaware limited partnership and is controlled and operated by its general partner, Dimensional. Holdings Inc., a Delaware corporation. Prior to November 3, 2006, the Advisor was named Dimensional Fund Advisors Inc. and was organized as a Delaware corporation. The Advisor controls Dimensional Fund Advisors Ltd. ("DFAL") and DFA Australia Limited ("DFA Australia"). As of February 29, 2008, assets under management for all Dimensional affiliated advisors totaled approximately $146 billion.

Investment Services-International Portfolio

The Advisor has entered into a Sub Advisory Agreement with each of DFAL (7 Down Street, London W1J7AJ, United Kingdom) and DFA Australia (Level 43 Gateway 1, MacQuarie Place, Sydney, New South Wales 2000, Australia), respectively, with respect to the International Portfolio. Pursuant to the terms of each Sub Advisory Agreement, DFAL and DFA Australia each have the authority and responsibility to select brokers and dealers to execute securities transactions for the International Portfolio. Each Sub Advisor's duties include the maintenance of a trading desk and the determination of the best and most efficient means of executing securities transactions. On at least a semi-annual basis, the Advisor will review the holdings of the International Portfolio and review the trading process and the execution of securities transactions. The Advisor is responsible for determining those securities that are eligible for purchase and sale by the International Portfolio and may delegate this task, subject to its own review, to DFAL and DFA Australia. DFAL and DFA Australia maintain and furnish to the Advisor information and reports on small companies in certain markets, including recommendations of securities to be added to the securities that are eligible for purchase by the International Portfolio, as well as making recommendations and elections on corporate actions. DFAL is a member of the Financial Services Authority ("FSA"), a self-regulatory organization for investment managers operating under the laws of England.

DIVIDENDS, CAPITAL GAINS DISTRIBUTIONS AND TAXES

*Dividends and Distributions.* Each Portfolio intends to qualify each year as a regulated investment company under the Internal Revenue Code (the "Code"). As a regulated investment company, a Portfolio generally pays no federal income tax on the income and gains it distributes to shareholders. Dividends from net investment income of each Portfolio are distributed quarterly (on a calendar basis) and any net realized capital gains (after any reductions for capital loss carry-forwards) are distributed annually, typically in December. Each Portfolio also may make an additional dividend distribution from net investment income in November of each year. The amount of any distribution will vary, and there is no guarantee either Portfolio will pay either an income dividend or a capital gains distribution.

Shareholders of each Portfolio will automatically receive all income dividends and capital gains distributions in additional shares of the Portfolio whose shares they hold at net asset value (as of the business date following the dividend record date), unless, upon written notice to the Advisor and completion of account information, the shareholder selects one of the options listed below:

Income Option - to receive income dividends in cash and capital gains distributions in additional shares at net asset value.

Capital Gains Option - to receive capital gains distributions in cash and income dividends in additional shares at net asset value.

Cash Option - to receive both income dividends and capital gains distributions in cash.

*Annual Statements.* Every January, each shareholder will receive a statement that shows the tax status of dividends and distributions received the previous calendar year. Distributions declared in December to shareholders of record in such month, but paid in January, are taxable as if they were paid in December.

*Avoid "Buying A Dividend."* If a taxable shareholder invests in a Portfolio shortly before the record date of a taxable distribution, the distribution will lower the value of the Portfolio's shares by the amount of the distribution and, in effect, the shareholder will receive some of the shareholder's investment back in the form of a taxable distribution.

*Tax Considerations.* In general, if a shareholder is a taxable investor, Portfolio distributions are taxable to the shareholder at either ordinary income or capital gains tax rates. This is true whether the shareholder reinvests distributions in additional Portfolio shares or receives them in cash.

For federal income tax purposes, Portfolio distributions of short-term capital gains are taxable to you as ordinary income.

Portfolio distributions of long-term capital gains are taxable to you as long-term capital gains no matter how long you have owned your shares. A portion of income dividends designated by a Portfolio may be qualified dividend income eligible for taxation by individual shareholders at long-term capital gains rates provided certain holding period requirements are met.

The International Portfolio may be subject to foreign withholding taxes on income from foreign securities. If more than 50% in value of the total assets of the International Portfolio is invested in securities of foreign corporations, the Portfolio may elect to pass through to its shareholders their pro rata share of foreign income taxes paid by the Portfolio. If this election is made, shareholders will be required to include in their gross income their pro rata share of these foreign taxes paid by the Portfolio, and will be entitled to deduct (as an itemized deduction in the case of individuals) their share of such foreign taxes in computing their taxable income or to claim a credit for such taxes against their U.S. federal income tax, subject to certain limitations under the Code, The sale of shares of a Portfolio is a taxable event and may result in a capital gain or loss to shareholders who are subject to tax. Capital gains or loss may be realized from an ordinary redemption of shares or an exchange of shares between two Portfolios. Any loss incurred on sale or exchange of a Portfolio's shares, held for six months or less, will be treated as a long-term capital loss to the extent of capital gain dividends received with respect to such shares.

By law, a Portfolio is required to withhold 28% of taxable dividends, capital gains distributions, and redemption proceeds paid to shareholders who do not provide their proper taxpayer identification number and certain required certifications.

Shareholders may avoid this withholding requirement by providing and certifying on the account registration form their correct Taxpayer Identification Number and by certifying that they are not subject to backup withholding and are U.S. persons (including U.S. resident aliens). A Portfolio must also withhold if the IRS instructs it to do so.

In addition to federal taxes, shareholders may be subject to state and local taxes on distributions from a Portfolio and on gains arising on redemption or exchange of a Portfolio's shares. Distributions of interest income and capital gains realized from certain types of U.S. government securities may be exempt from state personal income taxes.

Non-U.S. investors are subject to U.S. withholding tax at a 30% or lower treaty tax rate on dividends paid by a Portfolio, subject to limited exemptions for dividends designated as capital gain dividends, short-term capital gain dividends and interest-related dividends. The exemptions from withholding for short-term capital gain dividends and interest-related dividends sunset and will no longer apply to dividends paid with respect to taxable years of a Portfolio beginning after December 31, 2007 unless such exemptions are extended or made permanent. Notwithstanding such exemptions, non-U.S. investors are subject, to backup withholding at a rate of 28% on dividends, capital gains distributions, and redemption proceeds paid to shareholders who fails to properly certify they are not U.S. persons. Non-U.S. investors also may be subject to U.S. estate tax.

This discussion of "Dividends, Capital Gains Distributions and Taxes" is not intended or written to be used as tax advice. Prospective investors should consult the SAL Because everyone's tax situation Is unique, you should also consult your tax professional about federal, state, local or foreign tax consequences before making an investment in a Portfolio.

ELECTRONIC SHAREHOLDER INFORMATION AND TRANSACTIONS

In order to conserve natural resources, which the Advisor understands is an important consideration of the shareholders of the Portfolios, the Portfolios have adopted a policy that reflects such concerns, where possible, such that a shareholder, when opening an account, is encouraged to consent to the acceptance of all shareholder information about the Portfolio(s) in which the shareholders invests, through electronic delivery and access to the Portfolios' website to the extent a service provider can deliver an electronic copy.

The Portfolios may deliver paper-based shareholder information in certain circumstances at no extra cost to the investor. If a shareholder calls or e-mails the Portfolios to request paper-based shareholder information, or revokes consent to receive all shareholder information electronically, the Portfolios will deliver such information and the shareholder may be charged a fee of up to $15 to cover the costs of printing, shipping and handling.

Shareholder information includes prospectuses, statements of additional information, annual and semi-annual reports, confirmations and statements.

The Portfolios' website, address is www.dimensional.com. The current Prospectus of the Portfolios will be readily available for viewing and printing on the website.

An interruption in transmissions over the Internet generally or a problem in the transmission of the Portfolios' website in particular could result in a delay or interruption in the ability of shareholders to access the website or otherwise interact with the Portfolios.

PURCHASE OF SHARES

Cash Purchases

Investors may purchase shares of a Portfolio by first contacting the Advisor at (310) 395-8005 to notify the Advisor of the proposed investment. The Portfolios generally are available for investment only by institutional clients, clients of registered investment advisors, clients of financial institutions, and a limited number of certain other investors, as approved from time to time by the Advisor ("Eligible investors"). Eligible Investors include employees, former employees, shareholders, and directors of the Advisor and the Fund, and friends and family members of such persons. All investments are subject to approval by the Advisor and all investors must complete and submit the necessary account registration forms in good order. The Fund reserves the right to reject any initial or additional investment and to suspend the offering of shares of a Portfolio.

"Good order" with respect to the purchases of shares means that (1) a fully completed and properly signed Account Registration Form and any additional supporting legal documentation required by the Advisor have been received in legible form, and (2) the Advisor has been notified of the purchase by telephone and, if the Advisor so requests, also in writing, no later than the close of regular trading on the NYSE (normally 1:00 p.m. PT) on the day of the purchase. If an order to purchase shares must be cancelled due to nonpayment, the purchaser will be responsible for any loss incurred by the Fund arising out of such cancellation. To recover any such loss, the Fund reserves the right to redeem shares owned by any purchaser whose order is cancelled, and such purchaser may be prohibited or restricted in the manner of placing further orders.

Investors having an account with a bank that is a member or a correspondent of a member of the Federal Reserve System may purchase shares by first calling the Advisor at (310) 395-8005 to notify the Advisor of the proposed investment, then requesting the bank to transmit immediately available funds (federal funds) by wire to PNC Bank, N.A. for the account of DFA Investment Dimensions Group Inc. (specify Portfolio). Additional investments also may be made through the wire procedure by first notifying the Advisor. Investors who wish to purchase shares of a Portfolio by check should send their check to DFA Investment Dimensions Group Inc., c/o PFPC Inc., P.O. Box 8916, Wilmington, Delaware 19899-8916.

Payment of the total amount due should be made in U.S. dollars. However, subject to approval by the Advisor, payment may be made in any freely convertible currency and the necessary foreign exchange transactions will be arranged on behalf of, and at the expense of, the applicant. Applicants settling in any currency other than U.S. dollars are advised that a delay in processing a purchase or redemption may occur to allow for currency conversion.

Shares also may be purchased and sold by individuals through securities firms that may charge a service fee or commission for such transactions. No such fee or commission is charged on shares that are purchased or redeemed directly from the Fund. Investors who are clients of investment advisory organizations may also be subject to investment advisory fees under their own arrangements with such organizations.

In-Kind Purchases

If accepted by the Fund, shares of a Portfolio may be purchased in exchange for securities that are eligible for acquisition by the Portfolio or otherwise represented in its portfolio as described in this Prospectus or in exchange for local currencies in which such securities of the International Portfolio are denominated. Securities and local currencies accepted by the Fund for exchange and Portfolio shares to be issued in the exchange will be valued as set forth under "VALUATION OF SHARES" at the time of the next determination of net asset value after such acceptance, All dividends, interests, subscription, or other rights pertaining to such securities shall become the property of the Portfolio whose shares are being acquired and must be delivered to the Fund by the investor upon receipt from the issuer. Investors who desire to purchase shares of a Portfolio with local currencies should first contact the Advisor for wire instructions.

The Fund will not accept securities in exchange for shares of a Portfolio unless: (1) such securities are, at the time of the exchange, eligible to be included, or otherwise represented, in the Portfolio and current market quotations are readily available for such securities; (2) the investor represents and agrees that all securities offered to be exchanged are not subject to any restrictions upon their sale by the Portfolio under the Securities Act of 1933 or under the laws of the country in which the principal market for such securities exists, or otherwise; and (3) at the discretion of the Fund, the value of any such security (except U.S. government securities) being exchanged, together with other securities of the same issuer owned by the Portfolio, may not exceed 5% of the net assets of the Portfolio immediately after the transaction. The Fund will accept such securities for investment and not for resale.

A gain or loss for federal income tax purposes will generally be realized by investors who are subject to federal taxation upon the exchange depending upon the cost of the securities or local currency exchanged. Investors interested in such exchanges should contact the Advisor. Purchases of shares will be made in full and fractional shares calculated to three decimal places. In the interest of economy and convenience, certificates for shares will not be issued.

POLICY REGARDING EXCESSIVE OR SHORT-TERM TRADING

The Portfolios are designed for long-term investors and are not intended for investors that engage in excessive short-term trading activity that may be harmful to the Portfolios, including but not limited to market timing. Short-term or excessive trading into and out of the Portfolios can disrupt portfolio management strategies, harm performance, and increase Portfolio expenses for all shareholders, including long-term shareholders who do not generate these costs.

In addition, the International Portfolio may be more susceptible to the risks of short-term trading than other Portfolios. The nature of the holdings of the International Portfolio may present opportunities for a shareholder to engage in a short-term trading strategy that exploits possible delays between changes in the price of the Portfolio's holdings and the reflection of those changes in the Portfolio's net asset value (called "arbitrage market timing"). Such delays may occur because the International Portfolio has significant investments in foreign securities where, due to time zone differences, the values of those securities are established some time before the Portfolio calculates its net asset value. In such circumstances, the available market prices for such foreign securities may not accurately reflect the latest indications of value at the time the International Portfolio calculates its net asset value. There is a possibility that arbitrage market timing may dilute the value of the International Portfolio's shares if redeeming shareholders receive proceeds (and purchasing shareholders receive shares) based upon a net asset value that does not reflect appropriate fair value prices.

The Board of Directors of the Fund (the "Board") has adopted a policy (the "Trading Policy") and the Advisor and DFA Securities Inc. (collectively, "Dimensional") and their agents have implemented the following procedures, which are designed to discourage and prevent market timing or excessive short-term trading in the Portfolios: (i) trade activity monitoring and purchase blocking procedures, and (ii) use of fair value pricing.

The Fund, Dimensional and their agents monitor trades and flows of money in and out of the Portfolios from time to time in an effort to detect excessive short-term trading activities, and for consistent enforcement of the Trading Policy. The Fund reserves the right to take the actions necessary to stop excessive or disruptive trading activities, including refusing or canceling purchase or exchange orders for any reason, without prior notice, particularly purchase or exchange orders that the Fund believes are made on behalf of market timers. The Fund, Dimensional and their agents reserve the right to restrict, refuse or cancel any purchase or exchange request made by an investor indefinitely if the Fund or Dimensional believes that any combination of trading activity in the accounts is potentially disruptive to a Portfolio. In making such judgments, the Fund and Dimensional seek to act in a manner that is consistent with the interests of shareholders. For purposes of applying these procedures, Dimensional may consider an investor's trading history in the Portfolios, and accounts under common ownership, influence or control.

In addition to the Fund's general ability to restrict potentially disruptive trading activity as described above, the Fund also has adopted purchase blocking procedures. Under the Fund's purchase blocking procedures, where an investor has engaged in any two purchases and two redemptions (including redemptions that are part of an exchange transaction) in a Portfolio in any rolling 30 calendar day monitoring period (i.e., two "round trips"), the Fund and Dimensional intend to block the investor from making any additional purchases in that Portfolio for 90 calendar days (a "purchase block"). If implemented, a purchase block will begin at some point after the transaction that caused the investor to have engaged in the prohibited two round-trips is detected by the Fund, Dimensional, or their agents. The Fund and Dimensional are permitted to implement a longer purchase block, or permanently bar future purchases by an investor, if they determine that it is appropriate.

Under the Fund's purchase blocking procedures, the following purchases and redemptions will not trigger a purchase block: (i) purchases and redemptions of shares having a value in each transaction of less than $5,000; (ii) purchases and redemptions by U.S. registered investment companies that operate as funds of funds pursuant to Section 12(d)(1)(G) of the 1940 Act or an SEC exemptive order, and non-U.S. investment companies that operate as funds of funds (subject to monitoring by Dimensional); (iii) purchases and redemptions by a feeder portfolio of a master fund's shares: (iv) systematic or automated transactions where the shareholder, financial advisor or investment fiduciary does not exercise direct control over the investment decision; (v) retirement plan contributions, loans, loan repayments and distributions (including hardship withdrawals) identified as such in the retirement plan recordkeeper's system; (vi) purchase transactions involving transfers of assets, rollovers, Roth IRA conversions and IRA recharacterizations; (vii) purchases of shares with Portfolio dividends or capital gain distributions; (viii) transfers and reregistrations of shares within a Portfolio; and (ix) transactions by 529 Plans. Notwithstanding the Fund's purchase blocking procedures, all transactions in Portfolio shares are subject to the right of the Fund and Dimensional to restrict potentially disruptive trading activity (including purchases and redemptions described above that will not be subject to the purchase blocking procedures).

The Fund, Dimensional or their designees have the ability, pursuant to Rule 22c-2 under the 1940 Act, to request information from financial intermediaries, such as 401(k) plan administrators, trust companies and broker-dealers (together, "Intermediaries"), concerning trades placed in omnibus and other multi-investor accounts (together, "Omnibus Accounts"), in order to attempt to monitor trades that are placed by the underlying shareholders of these Omnibus Accounts. The Fund, Dimensional and their designees will use the information obtained from the Intermediaries to monitor trading in the Fund and to attempt to identify shareholders in Omnibus Accounts engaged in trading that is inconsistent with the Trading Policy or otherwise not in the best interests of the Fund. The Fund, Dimensional or their designees, when, they detect trading patterns in shares of a Portfolio (or other portfolios of the Fund) that may constitute short-term or excessive trading, will provide written instructions to the Intermediary to restrict or prohibit further purchases or exchanges of shares of the Portfolio (and other portfolios of the Fund) by a shareholder that has been identified as having engaged in excessive or short-term transactions in a Portfolio's shares (directly or indirectly through the Intermediary's account) that violate the Trading Policy.

The ability of the Fund and Dimensional to impose these limitations, including the purchase blocking procedures, on investors investing through Intermediaries is dependent on the receipt of information necessary to identify transactions by the underlying investors and the Intermediary's cooperation in implementing the Trading Policy. Investors seeking to engage in excessive short-term trading practices may deploy a variety of strategies to avoid detection, and despite the efforts of the Fund and Dimensional to prevent excessive short-term trading, there is no assurance that the Fund, Dimensional or their agents will be able to identify those shareholders or curtail their trading practices. The ability of the Fund, Dimensional and their agents to detect and limit excessive short-term trading also may be restricted, by operational systems and technological limitations.

The purchase blocking procedures of the Trading Policy may not apply to redemptions by shareholders whose shares are held on the books of Intermediaries if the Intermediaries have not adopted procedures to implement this Policy. The Fund and Dimensional will work with Intermediaries to develop such policies to institute the purchase blocking procedures or other procedures that the Fund and Dimensional determine are reasonably designed to achieve the objective of this Trading Policy. At the time the Intermediaries adopt these procedures, shareholders whose accounts are on the books of such Intermediaries will be subject to the Trading Policy's purchase blocking procedures or another frequent trading policy that achieves the objective of the purchase blocking procedures. Investors that invest in the Portfolios through an Intermediary should contact the Intermediary for information concerning the policies and procedures that apply to the investor.

As of the date of this Prospectus, the ability of the Fund and Dimensional to apply the purchase blocking procedures on purchases by all investors and the ability of the Fund and Dimensional to monitor trades through Omnibus Accounts maintained by Intermediaries may be restricted due to systems limitations of both the Fund's service providers and the Intermediaries. The Fund expects that the application of the Trading Policy as described above, including the purchase blocking procedures (subject to the limitations described above), will be able to be implemented by Intermediaries in compliance with Rule 22c-2 under the 1940 Act.

In addition, the purchase blocking procedures will not apply to a redemption transaction in which a Portfolio distributes portfolio securities to a shareholder in-kind, where the redemption will not disrupt the efficient portfolio management of the Portfolio and the redemption is consistent with the interests of the remaining shareholders of the Portfolio.

In addition to monitoring trade activity, the Board has adopted fair value pricing procedures that govern the pricing of the securities of the Portfolios. These procedures are designed to help ensure that the prices at which Portfolio shares are purchased and redeemed are fair, and do not result in dilution of shareholder interests or other harm to shareholders. See the discussion under "VALUATION OF SHARES—Net Asset Value" for additional details regarding fair value pricing of the Portfolios' securities.

Although the procedures are designed to discourage excessive short-term trading, none of the procedures individually nor all of the procedures taken together can completely eliminate the possibility that excessive short-term trading activity in a Portfolio may occur.

VALUATION OF SHARES

Net Asset Value

The net asset value per share of a Portfolio is calculated after the close of the NYSE (normally, 1:00 p.m. PT) by dividing the total value of the Portfolio's investments and other assets, less any liabilities, by the total outstanding shares of the stock of the Portfolio. A Portfolio generally calculates its net asset value per share and accepts purchase and redemption orders on days that the NYSE is open for trading. Note: The time at which transactions and shares are priced may be changed in case of an emergency or if the NYSE closes at a time other than 1:00 p.m. PT.

The value of shares of a Portfolio will fluctuate in relation to its investment experience. Securities held by a Portfolio will be valued in accordance with applicable laws and procedures adopted by the Board, and generally, as described below.

Securities held by a Portfolio (including over-the-counter securities) are valued at the last quoted sale price of the day. Securities held by a Portfolio that are listed on Nasdaq are valued at the Nasdaq Official Closing Price ("NOCP"). If there is no last reported sales price or NOCP of the day, a Portfolio values the securities at the mean between the most recent quoted bid and asked prices. Price information on listed securities is taken from the exchange where the security is primarily traded. Generally, securities issued by open-end investment companies are valued using their respective net asset values or public offering prices, as appropriate, for purchase orders placed at the close of the NYSE.

The value of the securities and other assets of a Portfolio for which no market quotations are readily available (including restricted securities), or for which market quotations have become unreliable, are determined in good faith at fair value in accordance with procedures adopted by the Board of the Fund. Fair value pricing may also be used if events that have a significant effect on the value of an investment (as determined in the discretion of the Investment Committee of the Advisor) occur before the net asset value is calculated. When fair value pricing is used, the prices of securities used by a Portfolio may differ from the quoted or published prices for the same securities on their primary markets or exchanges.

As of the date of this Prospectus, the International Portfolio will also fair value price in the circumstances described below. Generally, trading in foreign securities markets is completed each day at various times before the close of the NYSE. For example, trading in the Japanese securities markets is completed each day at the close of the Tokyo Stock Exchange (normally, 11:00 p.m. PT), which is fourteen hours before the close of the NYSE (normally, 1:00 p.m. PT) and the time that the net asset values of the International Portfolio is computed. Due to the time differences between the closings of the relevant foreign securities exchanges and the time the International Portfolio prices its shares at the close of the NYSE, the International Portfolio will fair value its foreign investments when it is determined that the market quotations for the foreign investments are either unreliable or not readily available. The fair value prices will attempt to reflect the impact of the U.S. financial markets' perceptions and trading activities on the International Portfolio's foreign investments since the last closing prices of the foreign investments were calculated on their primary foreign securities markets or exchanges. For these purposes, the Board of Directors of the Fund has determined that movements in relevant indices or other appropriate market indicators, after the close of the Tokyo Stock Exchange or the London Stock Exchange, demonstrate that market quotations may be unreliable, and may trigger fair value pricing. Consequently, fair valuation of portfolio securities may occur on a daily basis. The fair value pricing by the International Portfolio utilizes data furnished by an independent pricing service (and that data draws upon, among other information, the market values of foreign investments). The fair value prices of portfolio securities generally will be used when it is determined that the use of such prices will have a material impact on the net asset value of the International Portfolio. When the International Portfolio uses fair value pricing, the values assigned to the International Portfolio's foreign investments may not be the quoted or published prices of the investments on their primary markets or exchanges. The Board of Directors of the Fund monitors the operation of the method used to fair value price the International Portfolio's foreign investments.

Valuing securities at fair value involves greater reliance on judgment than valuing securities that have readily available market quotations. There can be no assurance that a Portfolio could obtain the fair value assigned to a security if it were to sell the security at approximately the time at which the Portfolio determines its net asset value per share. As a result, the sale or redemption by a Portfolio of its shares at net asset value, at a time when a holding or holdings are valued at fair value, may have the effect of diluting or increasing the economic interest of existing shareholders.

The net asset value per share of the International Portfolio is expressed in U.S. dollars by translating the net assets of the Portfolio using the mean of the most recent bid and asked prices for the dollar as quoted by generally recognized reliable sources. Since the International Portfolio owns securities that are primarily listed on foreign exchanges that may trade on days when the Portfolio does not price its shares, the net asset value of the Portfolio may change on days when shareholders will not be able to purchase or redeem shares.

Futures contracts are valued using the settlement price established each day on the exchange on which they are traded. The value of such futures contracts held by a Portfolio is determined each day as of such close.

Public Offering Price

Provided that the transfer agent has received the investor's Account Registration Form in good order and the custodian has received the investor's payment, shares of a Portfolio will be priced at the public offering price, which is the net asset value of the shares next determined after receipt of the investor's funds by the custodian. The transfer agent or the Fund may appoint, from time to time, sub-transfer agents or various financial intermediaries ("Intermediaries") for the receipt of purchase orders, redemption orders, and funds from certain investors. Intermediaries, in turn, are authorized to designate other financial intermediaries ("Sub-designees") to receive purchase and redemption orders for a Portfolio's shares from investors. With respect to such investors, the shares of a Portfolio will be priced at the public offering price calculated after receipt of the purchase order by the Intermediary or Sub-designee, as applicable, that is authorized to receive purchase orders. If the investor buys shares through an Intermediary or Sub-designee, the purchase price will be the public offering price next calculated after the Intermediary or Sub-designee, as applicable, receives the order, rather than on the day the custodian receives the investor's payment (provided that the Intermediary or Sub-designee, as applicable, has received the investor's purchase order in good order, and the investor has complied with the Intermediary's or Sub-designee's payment procedures). No reimbursement fee or sales charge is imposed on purchases. If an order to purchase shares must be canceled due to non-payment, the purchaser will be responsible for any loss incurred by a Portfolio arising out of such cancellation. The Fund reserves the right to redeem shares owned by any purchaser whose order is canceled to recover any resulting loss to a Portfolio and may prohibit or restrict the manner in which such purchaser may place further orders.

EXCHANGE OF SHARES

Investors may exchange shares of a Portfolio for shares of another portfolio by first contacting the Advisor at (310) 395-8005 to notify the Advisor of the proposed exchange and then sending a letter of instruction. Letters of instruction regarding exchanges of shares may be mailed to:

DFA Investment Dimensions Group Inc.

Attn: Client Operations

1299 Ocean Avenue

Santa Monica, CA 90401

The minimum amount for an exchange is $100,000. Contact the Advisor for information regarding the portfolios available for exchanges and to request a copy of the prospectus(es) of such portfolios. There is no fee imposed on an exchange. However, the Fund reserves the right to impose an administrative fee in order to cover the costs incurred in processing an exchange. Any such fee will be disclosed in the Prospectus. An exchange is treated as a redemption and a purchase. Therefore, an investor could realize a taxable gain or loss on the transaction. The Fund reserves the right to revise or terminate the exchange privilege, limit the amount of or reject any exchange, or waive the minimum amount requirement as deemed necessary, at any time.

Investors in a Portfolio also may exchange all or part of their Portfolio shares into certain portfolios of Dimensional Investment Group Inc., subject to the minimum purchase requirement set forth in the applicable portfolio's prospectus. Investors may contact the Advisor at the above-listed phone number for more information on such exchanges and to request a copy of the prospectuses of portfolios of Dimensional Investment Group Inc.

The exchange privilege is not intended to afford shareholders a way to speculate on short-term movements in the markets. Accordingly, in order to prevent excessive use of the exchange privilege that may potentially disrupt the management of a Portfolio or otherwise adversely affect the Fund, any proposed exchange is subject to the approval of the Advisor. Such approval will depend on: (i) the size of the proposed exchange; (ii) the prior number of exchanges by that shareholder; (iii) the nature of the underlying securities and the cash position of the portfolios involved in the proposed exchange; (iv) the transaction costs involved in processing the exchange; and (v) the total number of redemptions by exchange already made out of the Portfolio. Excessive use of the exchange privilege is defined as any pattern of exchanges among portfolios by an investor that evidences market timing.

The redemption and purchase prices of shares redeemed and purchased by exchange, respectively, are the net asset values next determined after the Advisor has received a letter of instruction in good order. "'Good order" means a completed letter of instruction specifying the dollar amount to be exchanged, signed by all registered owners of the shares; and if the Fund does not have on file the authorized signatures for the account, proof of authority and a guarantee of the signature of each registered owner by an "eligible guarantor institution." Such institutions generally include national or state banks, savings associations, savings and loan associations, trust companies, savings banks, credit unions, and members of a recognized stock exchange. Exchanges will be accepted only if stock certificates have not been issued and the shares of the Portfolio being acquired are registered in the investor's state of residence.

REDEMPTION OF SHARES

Redemption Procedure

Investors who desire to redeem shares of a Portfolio must first contact the Advisor at (310) 395-8005. A Portfolio will redeem shares at the net asset value of such shares next determined after receipt of a written request for redemption in good order, by the transfer agent (or by an Intermediary or a Sub-designee, if applicable). "Good order" means that the request to redeem shares must include all necessary documentation, to be received in writing by the Advisor no later than the close of regular trading on the NYSE (normally 1:00 p.m. PT), including but not limited to: a letter of instruction or a stock assignment specifying the number of shares or dollar amount to be redeemed, signed by all registered owners (or authorized representatives thereof) of the shares; and if the Fund does not have on file the authorized signatures for the account, proof of authority and a guarantee of the signature of each registered owner by an eligible guarantor institution; and any other required supporting legal documents. A signature guarantee may be obtained from a domestic bank or trust company, broker, dealer, clearing agency or savings association who are participants in a medallion program recognized by the Securities Transfer Association. The three recognized medallion programs are Securities Transfer Agents Medallion Program (STAMP), Stock Exchanges Medallion Program (SEMP), and New York Stock Exchange, Inc. Medallion Signature Program (MSP). Signature guarantees that are not a part of these programs will not be accepted.

Shareholders redeeming shares who have authorized redemption payment by wire in writing, may request that redemption proceeds be paid in federal funds wired to the bank they have designated in writing. The Fund reserves the right to send redemption proceeds by check in its discretion; a shareholder may request overnight delivery of such check at the shareholder's own expense. If the proceeds are wired to the shareholder's account at a bank that is not a member of the Federal Reserve System, there could be a delay in crediting the funds to the shareholder's bank account. The Fund reserves the right at any time to suspend or terminate the redemption by wire procedure after prior notification to shareholders. No fee is charged for redemptions. The redemption of all shares in an account will result in the account being closed. A. new Account Registration Form will be required for future investments. See "PURCHASE OF SHARES." In the interests of economy and convenience, certificates for shares are not issued.

Although the redemption payments will ordinarily be made within seven days after receipt, payment to investors redeeming shares that were purchased by check will not be made until the Fund can verify that the payments for the purchase have been, or will be, collected, which may take up to ten days or more. Investors may avoid this delay by submitting a certified check along with the purchase order.

Redemption of Small Accounts

With respect to the Portfolios, the Fund reserves the right, to redeem an account if the value of the shares in a Portfolio is $500 or less because of redemptions. Before the Fund involuntarily redeems shares from such an account and sends the proceeds to the shareholder, the Fund will give written notice of the redemption to the shareholder at least sixty days before the redemption date. The shareholder will then have sixty days from the date of the notice to make an additional investment in order to bring the value of the shares in the account for the Portfolio to more than $500 and avoid such involuntary redemption. The redemption price to be paid to a shareholder for shares redeemed by the Fund under this right will be the aggregate net asset value of the shares in the account at the close of business on the redemption date. This right to redeem small accounts applies to accounts established with the Fund's transfer agent.

In-Kind Redemptions

When in the best interests of a Portfolio, it may make a redemption payment, in whole or in part, by a distribution of portfolio securities in lieu of cash. Such distributions will be made in accordance with the federal securities laws and regulations governing mutual funds. A Portfolio also reserves the right to redeem its shares in the currencies in which its investments are denominated. Investors may incur brokerage charges and other transaction costs in selling such securities and converting such currencies to dollars. Also, the value of foreign securities or currencies may be affected by currency exchange fluctuations.

DISCLOSURE OF PORTFOLIO HOLDINGS

Each Portfolio generally will disclose up to its 25 largest portfolio holdings (other than cash and cash equivalents) and the percentages that each of these largest portfolio holdings represent of the total assets of the Portfolio, as of the most recent month-end, online at the Advisor's public website, http://www.dimensional.com, within 20 days after the end of each month. Each Portfolio also generally will disclose its complete portfolio holdings (other than cash and cash equivalents), as of month-end, online at the Advisor's public website, three months following the month-end. Please consult the SAI for a description of the other policies and procedures that govern disclosure of the portfolio holdings by the Portfolios.

DELIVERY OF SHAREHOLDER DOCUMENTS

To eliminate duplicate mailings and reduce expenses, the Portfolios may deliver a single copy of certain shareholder documents, such as this Prospectus and annual and semi-annual reports, to related shareholders at the same address, even if accounts are registered in different names. This practice is known as "householding." The Portfolios will not household personal information documents, such as account statements. If you do not want the mailings of these documents to be combined with those of other members of your household, please call us collect at (310) 395-8005. We will begin sending individual copies of the shareholder documents to you within 30 days of receiving your request.

SERVICE PROVIDERS

| Investment Advisor DIMENSIONAL FUND ADVISORS LP 1299 Ocean Avenue Santa Monica, CA 904(31 Tel. No. (310) 395-8005 | |
|---|---|
| Sub-Advisors DIMENSIONAL FUND ADVISORS LTD. 7 Down Street London W1J7AJ United Kingdom Tel. No. (20) 7016-4500 DFA AUSTRALIA LIMITED Level 43 Gateway 1 MacQuarie Place | Accounting Services, Dividend Disbursing, and Transfer Agent PFPC INC. 301 Bellevue Parkway Wilmington, DE 19809 |
| | Legal Counsel STRADLEY, RONON, STEVENS & YOUNG, LLP 2600 One Commerce Square Philadelphia, PA 19103-7098 |

| | |
|---|---|
| Sydney, New South Wales 2000 Australia<br><br>Tel. No. (612) 8 336-7100 | Independent Registered Public Accounting Firm<br><br>PRICEWATERHOUSECOOPERS LLP<br><br>Two Commerce Square Suite 1700 2001 Market Street Philadelphia, PA 19103-7042 |
| Custodian—International<br><br>CITIBANK, N.A.<br><br>111 Wall Street<br><br>New York, NY 10005 | Custodian—Domestic<br><br>PFPC TRUST COMPANY<br><br>301 Bellevue Parkway<br><br>Wilmington, DE 19809 |

Other Available Information

You can find more information about the Fund and the Portfolios in the Portfolios' SAI and Annual and Semi-Annual Reports.

Statement of Additional Information. The SAI supplements, and is technically part of, this Prospectus. It includes an expanded discussion of investment practices, risks, and fund operations.

Annual and Semi-Annual Reports to Shareholders. These reports focus on Portfolio holdings and performance. The Annual Report also discusses the market conditions and investment strategies that significantly affected each Portfolio in its last fiscal year. The Portfolios are new, so these reports are not yet available for the Portfolios.

*Request free copies from*:

- Your investment advisor—if you are a client of an investment advisor who has invested in the Portfolio on your behalf.

- The Fund—if you represent an institutional investor, registered investment advisor or other qualifying investor. Call collect at (310) 395-8005.
- Access them on our website at http://www.dimensional.com.
- Access them on the EDGAR Database in the SECs Internet site at http://www.sec.gov.
- Review and copy them at the SECs Public Reference Room in Washington D.C. (phone 1-800-SEC-0330).
- Request copies from the Public Reference Section of the SEC, Washington, D.C, 20549-0102 or at publicinfo@sec.gov (you will be charged a copying fee). Information on the operation of the SECs public reference room is available by calling the SEC at 1 -202-551 -8090.

Dimensional Fund Advisors LP

1299 Ocean Avenue

Santa Monica, CA 90401

(310) 395-8005

DFA Investment Dimensions Group Inc.—Registration No. 811-3258

FSC

Mixed Sources

Product group from well-managed forests, controlled sources and recycled wood or fiber Cert no. SCS COC-00648 www.fisc.crg

© 1998 Forest Stewardship Council

Printed with SOOYINK rrd032908-018

Appendix B

▷ Dimensional

Dimensional   Philosophy   Application   Strategies   Service   Library
US   Non-US   Fixed Income   Global   Separate Accounts
Prices & Distributions   Performance Search

[                    ]

Secure Site Login

Username:

[                    ]

Password:

[                    ]

☐   Remember me

New user?   Register here

Find an Advisor

Use our online form to find an advisor near you with access to Dimensional

Downloads

Prospectus

SAI

US Sustainability Core 1 Portfolio

🖶 Print this     ✉ E-mail this

| Select another US Equity fund ▼ |
|---|

Inception Date   Ticker Symbol   CUSIP Number
March 12, 2008   DFSIX   233-203-215

The US Sustainability Core 1 Portfolio is a no-load mutual fund designed to achieve long-term capital appreciation. The Portfolio seeks to purchase a broad and diverse range of US securities with an increased exposure to small cap stocks and those it considers to be value stocks, relative to the market universe. In assessing value, Dimensional may consider factors such as the issuer's securities having a high book value in relation to their market value, as well as price-to-cash-flow or price-to-earnings ratios.

The Portfolio seeks to take into account environmental impact considerations when determining security weights. Relative to a portfolio without such criteria, the Portfolio seeks to exclude or underweight securities of companies that, according to its environmental impact considerations, may have a relatively negative impact on the environment; and it seeks to overweight securities of companies that may have a relatively positive impact on the environment.

For a full description, please consult the Portfolio's prospectus.

Prices

Updated Daily

| Date | Closing Price | NAV Change $ | NAV Change % |
|---|---|---|---|
| May 28, 2008 | $10.82 | $0.06 | 0.56% |

These Net Asset Values ("NAVs") have been prepared by the fund accounting agent. Dimensional Fund Advisors reserves the right to restate these NAVs, if necessary, at any time.

Performance

| Updated Monthly Total Returns | One Month | Three Month | Year to-Date |
|---|---|---|---|
| As of April 30, 2008 | 4.51% | N/A | N/A |

| Average Annual Total Returns | One Year | Five Year | Ten Year | Since Inception |
|---|---|---|---|---|
| As of April 30, 2008 | N/A | N/A | N/A | 6.50%* |

\* Returns for periods less than one year are not annualized.

Updated Quarterly

| Average Annual Total Returns | One Year | Five Year | Ten Year | Since Inception |
|---|---|---|---|---|
| As of March 31, 2008 | N/A | N/A | N/A | 1.90%* |

\* Returns for periods less than one year are not annualized.

Performance data represents past performance. Past performance is no guarantee of future results, and current performance may be higher or lower than the performance displayed. The investment return and principal value of an investment will fluctuate such that an investor's shares, when redeemed, may be worth more or less than their original cost. Total returns include reinvestment of dividends and capital gains and are net of all fees and expenses. Prior to April 2002, certain international equity portfolios charged a reimbursement fee to the purchasers of shares of those portfolios.

| Annual Expenses | Total Operating Expense Ratio | Net Expense Ratio (to investor) |
|---|---|---|
| As of March 29, 2008 | 0.38% | 0.37% |

Dimensional has contractually agreed to waive certain fees and assume expenses for a one-year period set to terminate on April 1 unless renewed. Dimensional may seek reimbursement for amounts previously waived under the conditions outlined in the prospectus.

Top Holdings

| As of April 30, 2008 | % of Portfolio |
|---|---|
| CHEVRON CORP | 3.24 |
| BANK OF AMERICA CORP | 2.22 |
| CHASE MANHATTAN CORP NEW COM | 2.07 |
| GENERAL ELECTRIC CO. | 2.01 |
| VERIZON COMMUNICATIONS INC | 1.60 |
| PFIZER INC | 1.59 |
| NORWEST CORP. | 1.42 |
| CONOCOPHILLIPS | 1.40 |
| JOHNSON & JOHNSON | 1.33 |
| MICROSOFT CORP | 1.25 |
| WALT DISNEY CO/THE | 1.15 |
| INTERNATIONAL BUSINESS MACHINES | 1.15 |

| | |
|---|---|
| PROCTER & GAMBLE CO | 0.98 |
| APPLE INC | 0.85 |
| COCA-COLA CO/THE | 0.81 |
| AMERICAN INTERNATIONAL GROUP I | 0.72 |
| TIME WARNER INC | 0.69 |
| SCHLUMBERGER LTD | 0.68 |
| HEWLETT PACKARD CO. | 0.68 |
| KRAFT FOODS INC | 0.62 |
| Total | 26.46 |

View proxy vote filings.

Market Risk

Even a long-term investment approach cannot guarantee a profit. Economic, political, and issuer-specific events will cause the value of securities, and the funds that own them, to rise or fall. Because the value of your investment in a fund will fluctuate, there is a risk that you will lose money.

Small Company Risk

Securities of small firms are often less liquid than those of large companies. As a result, small company stocks may fluctuate relatively more in price.

Environmental Impact Consideration Investment Risk

A Portfolio's environmental impact considerations may limit the number of investment opportunities available to the Portfolio, and as a result, at times, the Portfolio may produce more modest gains than funds that are not subject to such special investment considerations. For example, a Portfolio may decline to purchase, or underweight its investment in, certain securities due to environmental impact considerations when other investment considerations would suggest that a more significant investment in such securities would be advantageous. In addition, a Porfolio may sell certain securities due to environmental impact considerations when it is otherwise disadvantageous to do so. The environmental impact considerations may cause the Portfolio's industry allocation to deviate from that of funds without these considerations and of conventional benchmarks.

Dimensional Fund Advisors is an investment advisor registered with the Securities and Exchange Commission. Consider the Investment objectives, risks, and charges and expenses of the Dimensional funds carefully before investing. For this and other information about the Dimensional funds, please read the prospectus carefully before investing. Prospectuses are available by calling Dimensional Fund Advisors collect at (310) 395-8005; on the Internet at www.dimensional.com; or, by mail, DFA Securities Inc., c/o Dimensional Fund Advisors, 1299 Ocean Avenue, Santa Monica, CA 90401.

Mutual funds distributed by DFA Securities Inc.

© 2008 Dimensional Fund Advisors

International Sustainability Core 1 Portfolio

🖨 Print this    ✉ E-mail this

| Select another International Equity fund ▼ |
|---|

Inception Date  
March 12, 2008

CUSIP Number  
233-203-199

The International Core Equity Portfolio is a no-load mutual fund designed to achieve long-term capital appreciation. The Portfolio seeks to purchase a broad and diverse group of stocks of non-US companies in developed markets with an increased exposure to small cap stocks and those it considers to be value stocks. In assessing value, Dimensional may consider factors such as the issuer's securities having a high book value in relation to their market value, as well as price-to-cash-flow or price-to-earnings ratios. The Portfolio may invest in companies in Australia, Austria, Belgium, Canada, Denmark, Finland, France, Germany, Greece, Hong Kong, Ireland, Italy, Japan, the Netherlands, New Zealand, Norway, Portugal, Singapore, Spain, Sweden, Switzerland, and the United Kingdom.

The Portfolio seeks to take into account environmental impact considerations when determining security weights. Relative to a portfolio without such criteria, the Portfolio seeks to exclude or underweight securities of companies that, according to its environmental impact considerations, may have a relatively negative impact on the environment; and it seeks to overweight securities of companies that may have a relatively positive impact on the environment.

For a full description, please consult the Portfolio's prospectus.

Prices

Updated Daily

| Date | Closing Price | NAV Change $ | NAV Change % |
|---|---|---|---|
| May 28, 2008 | $10.664 | $0.02 | 0.19% |

These Net Asset Values ("NAVs") have been prepared by the fund accounting agent. Dimensional Fund Advisors reserves the right to restate these NAVs, if necessary, at any time.

Performance

| Updated Monthly Total Returns | One Month | Three Month | Year to-Date | |
|---|---|---|---|---|
| As of April 30, 2008 | 3.86% | N/A | N/A | |

| Average Annual Total Returns | One Year | Five Year | Ten Year | Since Inception |
|---|---|---|---|---|
| As of April 30, 2008 | N/A | N/A | N/A | 5.00%* |

* Returns for periods less than one year are not annualized.

Updated Quarterly

| Average Annual Total Returns | One Year | Five Year | Ten Year | Since Inception |
|---|---|---|---|---|
| As of March 31, 2008 | N/A | N/A | N/A | 1.10%* |

* Returns for periods less than one year are not annualized.

Performance data represents past performance. Past performance is no guarantee of future results, and current performance may be higher or lower than the performance displayed. The investment return and principal value of an investment will fluctuate such that an investor's shares, when redeemed, may be worth more or less than their original cost. Total returns include reinvestment of dividends and capital gains and are net of all fees and expenses. Prior to April 2002, certain international equity portfolios charged a reimbursement fee to the purchasers of shares of those portfolios.

| Annual Expenses | Total Operating Expense Ratio | Net Expense Ratio (to investor) |
|---|---|---|
| As of March 29, 2008 | 0.57% | 0.57% |

Dimensional has contractually agreed to waive certain fees and assume expenses for a one-year period set to terminate on April 1 unless renewed. Dimensional may seek reimbursement for amounts previously waived under the conditions outlined in the prospectus.

Top Holdings

| As of April 30, 2008 | % of Portfolio |
|---|---|
| HSBC HOLDINGS PLC | 1.66 |
| VODAFONE GROUP PLC | 1.18 |
| ROCHE HOLDING AG | 1.08 |
| BHP BILUTON LTD | 1.01 |
| SIEMENS AG | 0.99 |
| ING GROEP NV | 0.92 |
| BNP PARIBAS | 0.91 |

| | |
|---|---|
| TOYOTA MOTOR CORP | 0.90 |
| NESTLE SA | 0.83 |
| BARCLAYS PLC | 0.80 |
| GLAXOSMITHKLINE PLC | 0.74 |
| BANCO SANTANDER SA | 0.73 |
| BANCO BILBAO VIZCAYA ARGENTARIA SA | 0.73 |
| NOKIA OYJ | 0.67 |
| ALUANZ SE | 0.67 |
| SWISS REINSURANCE | 0.62 |
| TELEFONICA SA | 0.60 |
| ROYAL BANK OF CANADA | 0.60 |
| AVIVA PLC | 0.58 |
| NOVARTIS AG | 0.56 |
| Total | 16.78 |

View proxy vote filings.

Market Risk

Even a long-term investment approach cannot guarantee a profit. Economic, political, and issuer-specific events will cause the value of securities, and the funds that own them, to rise or fall. Because the value of your investment in a fund will fluctuate, there is a risk that you will lose money.

Small Company Risk

Securities of small firms are often less liquid than those of large companies. As a result, small company stocks may fluctuate relatively more in price.

Foreign Securities and Currencies Risk

Foreign securities prices may decline or fluctuate because of:
(a) economic or political actions of foreign governments, and/or (b) less regulated or liquid securities markets. Investors holding these securities are also exposed to foreign currency risk (the possibility that foreign currency will fluctuate in value against the US dollar).

Environmental Impact Consideration Investment Risk

A Portfolio's environmental impact considerations may limit the number of investment opportunities available to the Portfolio, and as a result, at times, the Portfolio may produce more modest gains than funds that are not subject to such special investment considerations. For example, a Portfolio may decline to purchase, or underweight its investment in, certain securities due to environmental impact considerations when other investment considerations would suggest that a more significant investment in such securities would be advantageous. In addition, a Portfolio may sell certain securities due to environmental impact considerations when it is otherwise disadvantageous to do so. The environmental impact considerations may cause the Portfolio's industry allocation to deviate from that of funds without these considerations and of conventional benchmarks.

Dimensional Fund Advisors is an investment advisor registered with the Securities and Exchange Commission. Consider the investment objectives, risks, and charges and expenses of the Dimensional funds carefully before investing. For this and other information about the Dimensional funds, please read the prospectus carefully before investing. Prospectuses are available by calling Dimensional Fund Advisors collect at (310) 395-8005; on the Internet at www.dimensional.com; or, by mail, DFA Securities Inc., c/o Dimensional Fund Advisors, 1299 Ocean Avenue, Santa Monica, CA 90401.

Mutual funds distributed by DFA Securities Inc.

© 2008 Dimensional Fund Advisors

US Core Equity 1 Portfolio

🖶 Print this    ✉ E-mail this

| Inception Date | Ticker Symbol | CUSIP Number |
|---|---|---|
| September 15, 2005 | DFEOX | 233-203-413 |

The US Core Equity 1 Portfolio is a no-load mutual fund designed to achieve long-term capital appreciation. The Portfolio seeks to purchase a broad and diverse range of US securities with an increased exposure to small cap stocks and those it considers value stocks relative to the market universe. The universe is comprised of companies listed on the New York Stock Exchange, American Stock Exchange and Nasdaq National Market System. Increased exposure to small and value companies may be achieved by decreasing the allocation of the portfolio's assets in large growth companies relative to their weight in the universe. In assessing value, Dimensional may consider factors such as the issuer's securities having a high book value in relation to their market value, as well as price to cash flow or price to earnings ratios.

For a full description, please consult the Portfolio's prospectus.

Prices
Updated Daily

| Date | Closing Price | NAV Change $ | NAV Change % |
|---|---|---|---|
| May 28, 2008 | $11.35 | $0.06 | 0.53% |

These Net Asset Values ("NAVs") have been prepared by the fund accounting agent. Dimensional Fund Advisors reserves the right to restate these NAVs, if necessary, at any time.

Performance

| Updated Daily | | | |
|---|---|---|---|
| Total Returns | | | Year-to-Date |
| As of May 28, 2008 | | | -3.02% |

| Updated Monthly | One | Three | Year |
|---|---|---|---|
| Total Returns | Month | Month | Year-to-Date |
| As of April 30, 2008 | 4.99% | 1.13% | -4.64% |

| Average Annual | One | Five | Ten | Since |
|---|---|---|---|---|
| Total Returns | Year | Year | Year | Inception |
| As of April 30, 2008 | -7.17% | N/A | N/A | 5.80% |

| Updated Quarterly | | | | |
|---|---|---|---|---|
| Average Annual | One | Five | Ten | Since |
| Total Returns | Year | Year | Year | Inception |
| As of March 31, 2008 | -8.27% | N/A | N/A | 3.99% |

Performance data represents past performance. Past performance is no guarantee of future results, and current performance may be higher or lower than the performance displayed. The investment return and principal value of an investment will fluctuate such that an investor's shares, when redeemed, may be worth more or less than their original cost. Total returns include reinvestment of dividends and capital gains and are net of all fees and expenses. Prior to April 2002, certain international equity portfolios charged a reimbursement fee to the purchasers of shares of those portfolios.

| Annual Expenses | Total Operating Expense Ratio | Net Expense Ratio (to investor) |
|---|---|---|
| As of November 30, 2007 | 0.20% | 0.20% |

Dimensional has contractually agreed to waive certain fees and assume expenses for a one-year period set to terminate on April 1 unless renewed. Dimensional may seek reimbursement for amounts previously waived under the conditions outlined in the prospectus.

Distributions
Last 12 Months

| Type | Amount per Share | Record Date | Ex-dividend Date | Payable Date | Ex-dividend Price |
|---|---|---|---|---|---|
| Dividend | $0.0320 | 3/7/2008 | 3/10/2008 | 3/13/2008 | $10.20 |
| Dividend | $0.0180 | 12/18/2007 | 12/19/2007 | 12/24/2007 | $11.59 |
| Dividend | $0.0410 | 11/23/2007 | 11/26/2007 | 11/29/2007 | $11.28 |
| Dividend | $0.0430 | 9/7/2007 | 9/10/2007 | 9/13/2007 | $11.77 |
| Dividend | $0.0450 | 6/7/2007 | 6/8/2007 | 6/13/2007 | $12.45 |

Top Holdings

| As Of April 30, 2008 | % of Portfolio |
|---|---|
| EXXON MOBIL CORP | 2.25 |
| MICROSOFT CORP | 1.19 |
| GENERAL ELECTRIC CO | 1.12 |
| BANK OF AMERICA CORP | 1.08 |
| AT&T INC | 1.08 |

| | |
|---|---|
| JPMORGAN CHASE & CO | 1.05 |
| CHEVRON CORP | 0.98 |
| WAL-MART STORES INC | 0.95 |
| PFIZER INC | 0.88 |
| CONOCOPHILUPS | 0.87 |
| JOHNSON & JOHNSON | 0.86 |
| VERIZON COMMUNICATIONS INC | 0.81 |
| PROCTER & GAMBLE CO | 0.79 |
| AMERICAN INTERNATIONAL GROUP I | 0.76 |
| INTERNATIONAL BUSINESS MACHINES CORP | 0.75 |
| CISCO SYSTEMS INC | 0.72 |
| WELLS FARGO & CO | 0.62 |
| APPLE INC | 0.62 |
| COCA-COLA CO/THE | 0.62 |
| GOOGLE INC | 0.60 |
| Total | 18.60 |

Sector Allocations

| As of April 30, 2008 | % of Portfolio |
|---|---|
| Consumer Discretionary | 12.0 |
| Consumer Staples | 8.2 |
| Energy | 11.7 |
| Financials | 17.2 |
| Health Care | 11.2 |
| Industrials | 12.8 |
| Information Technology | 15.4 |
| Materials | 5.2 |
| Other | 0.0 |
| Telecommunication Services | 2.8 |

| | |
|---|---|
| Utilities | 3.7 |
| Total | 100.0 |

Sectors defined by MSCI.

View proxy vote filings.

Market Risk

Even a long-term investment approach cannot guarantee a profit. Economic, political, and issuer-specific events will cause the value of securities, and the funds that own them, to rise or fall. Because the value of your investment in a fund will fluctuate, there is a risk that you will lose money.

Small Company Risk

Securities of small firms are often less liquid than those of large companies. As a result, small company stocks may fluctuate relatively more in price.

Dimensional Fund Advisors is an investment advisor registered with the Securities and Exchange Commission. Consider the investment objectives, risks, and charges and expenses of the Dimensional funds carefully before investing. For this and other information about the Dimensional funds, please read the prospectus carefully before investing. Prospectuses are available by calling Dimensional Fund Advisors collect at (310) 395-8005; on the Internet at www.dimensional.com; or, by mail, DFA Securities Inc., c/o Dimensional Fund Advisors, 1299 Ocean Avenue, Santa Monica, CA 90401.

Mutual funds distributed by DFA Securities Inc.

© 2008 Dimensional Fund Advisors

International Core Equity Portfolio

🖨 Print this    ✉ E-mail this

| Select another International Equity fund ▼ |
|---|

Inception Date      Ticker Symbol      CUSIP Number
September 15, 2005      DFIEX                  233-203-371

The International Core Equity Portfolio is a no-load mutual fund designed to achieve long-term capital appreciation. The Portfolio seeks to purchase a broad and diverse group of stocks of non-US companies in developed markets with an increased exposure to small cap stocks and those it considers value stocks. Increased exposure to small and value companies may be achieved by decreasing the allocation of the portfolio's assets in the large growth companies relative to their weight in the universe. In assessing value, Dimensional may consider factors such as the issuer's securities having a high book value in relation to their market value, as well as price to cash flow or price to earnings ratios. The Portfolio currently invests in companies in Australia, Austria, Belgium, Canada, Denmark, Finland, France, Germany, Greece, Hong Kong, Ireland, Italy, Japan, Netherlands, New Zealand, Norway, Portugal, Singapore, Spain, Sweden, Switzerland, and the United Kingdom.

For a full description, please consult the Portfolio's prospectus.

Prices

Updated Daily

| Date | Closing Price | NAV Change $ | NAV Change % |
|---|---|---|---|
| May 28, 2008 | $13.52 | $0.03 | 0.22% |

These Net Asset Values ("NAVs") have been prepared by the fund accounting agent. Dimensional Fund Advisors reserves the right to restate these NAVs, if necessary, at any time.

Performance

Updated Daily

| Total Returns | Year-to-Date |
|---|---|
| As of May 28, 2008 | -1.98% |

| Updated Monthly Total Returns | One Month | Three Month | Year Year-to-Date |
|---|---|---|---|
| As of April 30, 2008 | 4.13% | 4.78% | -3.12% |

| Average Annual Total Returns | One Year | Five Year | Ten Year | Since Inception |
|---|---|---|---|---|
| As of April 30, 2008 | -4.06% | N/A | N/A | 14.29% |

Updated Quarterly

| Average Annual Total Returns | One Year | Five Year | Ten Year | Since Inception |
|---|---|---|---|---|
| As of March 31, 2008 | -4.41% | N/A | N/A | 12.96% |

Performance data represents past performance. Past performance is no guarantee of future results, and current performance may be higher or lower than the performance displayed. The investment return and principal value of an investment will fluctuate such that an investor's shares, when redeemed, may be worth more or less than their original cost. Total returns include reinvestment of dividends and capital gains and are net of all fees and expenses. Prior to April 2002, certain international equity portfolios charged a reimbursement fee to the purchasers of shares of those portfolios.

| Annual Expenses | Total Operating Expense Ratio | Net Expense Ratio (to investor) |
|---|---|---|
| As of November 30, 2007 | 0.41% | 0.41% |

Dimensional has contractually agreed to waive certain fees and assume expenses for a one-year period set to terminate on April 1 unless renewed. Dimensional may seek reimbursement for amounts previously waived under the conditions outlined in the prospectus.

Distributions
Last 12 Months

| Type | Amount per Share | Record Date | Ex-dividend Date | Payable Date | Ex-dividend Price |
|---|---|---|---|---|---|
| Dividend | $0.0180 | 3/7/2008 | 3/10/2008 | 3/13/2008 | $12.25 |
| Dividend | $0.0220 | 12/18/2007 | 12/19/2007 | 12/24/2007 | $13.41 |
| LT Capital Gain | $0.1040 | 12/18/2007 | 12/19/2007 | 12/24/2007 | $13.41 |
| ST Capital Gain | $0.0460 | 12/18/2007 | 12/19/2007 | 12/24/2007 | $13.41 |
| Dividend | $0.0610 | 11/23/2007 | 11/26/2007 | 11/29/2007 | $13.48 |
| Dividend | $0.0550 | 9/7/2007 | 9/10/2007 | 09/13/2007 | $13.70 |
| Dividend | $0.1690 | 6/7/2007 | 6/8/2007 | 06/13/2007 | $14.39 |

Top Holdings

| As of April 30, 2008 | % of Portfolio |
|---|---|
| HSBC HOLDINGS PLC | 1.41 |
| VODAFONE GROUP PLC | 1.10 |
| BP PLC | 0.96 |
| NESTLE SA | 0.82 |
| ROYAL DUTCH SHELL PLC | 0.74 |
| BANCO SANTANDER SA | 0.66 |
| E.ON AG | 0.56 |
| BNP PARIBAS | 0.55 |
| ZURICH FINANCIAL SERVICES AG | 0.55 |
| BANCO BILBAO VIZCAYA ARGENTARIA SA | 0.53 |
| TOYOTA MOTOR CORP | 0.52 |
| NOVARTIS AG | 0.51 |
| ARCELORMITTAL | 0.50 |
| ROYAL BANK OF SCOTLAND GROUP PLC | 0.46 |
| DAIMLER AG | 0.43 |
| ROCHE HOLDING AG | 0.42 |
| UNICREDIT SPA | 0.41 |
| SIEMENS AG | 0.41 |
| FORTIS | 0.40 |
| ING GROEP NV | 0.39 |
| Total | 12.33 |

Sector Allocations

| As of April 30, 2008 | % of Portfolio |
|---|---|
| Consumer Discretionary | 13.1 |
| Consumer Staples | 6.9 |
| Energy | 7.7 |
| Financials | 29.7 |
| Health Care | 3.8 |
| Industrials | 15.6 |
| Information Technology | 4.9 |
| Materials | 12.1 |
| Other | 0.0 |
| Reits | 0.0 |
| Telecommunication Services | 3.5 |
| Utilities | 2.7 |
| Total | 100.0 |

Sectors defined by MSCI.

View proxy vote filings.

Market Risk

Even a long-term investment approach cannot guarantee a profit. Economic, political, and issuer-specific events will cause the value of securities, and the funds that own them, to rise or fall. Because the value of your investment in a fund will fluctuate, there is a risk that you will lose money.

Small Company Risk

Securities of small firms are often less liquid than those of large companies. As a result, small company stocks may fluctuate relatively more in price.

Foreign Securities and Currencies Risk

Foreign securities prices may decline or fluctuate because of: (a) economic or political actions of foreign governments, and/or (b) less regulated or liquid securities markets. Investors holding these securities are also exposed to foreign currency risk (the possibility that foreign currency will fluctuate in value against the US dollar).

Dimensional Fund Advisors is an investment advisor registered with the Securities and Exchange Commission. Consider the investment objectives, risks, and charges and expenses of the Dimensional funds carefully before investing. For this and other information about the Dimensional funds, please read the prospectus carefully before investing. Prospectuses are available by calling Dimensional Fund Advisors collect at (310) 395-8005; on the Internet at www.dimensional.com; or, by mail, DFA Securities Inc., c/o Dimensional Fund Advisors, 1299 Ocean Avenue, Santa Monica, CA 90401.

Mutual funds distributed by DFA Securities Inc.

© 2008 Dimensional Fund Advisors